(12) United States Patent  
Kwak et al.

(10) Patent No.: US 11,991,002 B2  
(45) Date of Patent: May 21, 2024

(54) METHOD AND APPARATUS FOR ADJUSTING THRESHOLD FOR DETERMINING HARQ FEEDBACK IN NR V2X

(71) Applicant: LG ELECTRONICS INC., Seoul (KR)

(72) Inventors: Kyuhwan Kwak, Seoul (KR); Hanbyul Seo, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 546 days.

(21) Appl. No.: 17/283,776

(22) PCT Filed: Sep. 3, 2019

(86) PCT No.: PCT/KR2019/011299  
§ 371 (c)(1),  
(2) Date: Apr. 8, 2021

(87) PCT Pub. No.: WO2020/091211  
PCT Pub. Date: May 7, 2020

(65) Prior Publication Data  
US 2021/0391954 A1 Dec. 16, 2021

Related U.S. Application Data

(60) Provisional application No. 62/754,554, filed on Nov. 1, 2018.

(51) Int. Cl.  
*H04L 1/1812* (2023.01)  
*H04L 1/1867* (2023.01)  
*H04W 92/18* (2009.01)

(52) U.S. Cl.  
CPC .......... *H04L 1/1819* (2013.01); *H04L 1/1896* (2013.01); *H04W 92/18* (2013.01)

(58) Field of Classification Search  
CPC ..... H04L 1/1819; H04L 1/1896; H04W 92/18  
See application file for complete search history.

(56) References Cited

U.S. PATENT DOCUMENTS 7,502,981 B2    3/2009  Cai et al.  
2003/0206524 A1*  11/2003  Mohanty ............... H04L 1/1809  
370/347

(Continued)

FOREIGN PATENT DOCUMENTS

WO    2013133607    9/2013

OTHER PUBLICATIONS

3rd Generation Partnership Project (3GPP), "Technical Specification Group Radio Access Network; Evolved Universal Terrestrial Radio Access (E-UTRA); Medium Access Control (MAC) protocol specification (Release 15)," 3GPP TS 36.321 V15.3.0, Sep. 2018, 127 pages.

*Primary Examiner* — Mohammad S Adhami  
*Assistant Examiner* — Daniel Chester Ozimina  
(74) *Attorney, Agent, or Firm* — LEE, HONG, DEGERMAN, KANG & WAIMEY

(57) ABSTRACT

Provided are a method, performed by a first terminal, for adjusting a threshold for determining hybrid automatic repeat request (HARQ) feedback in a wireless communication system, and an apparatus for supporting the same. The method comprises the steps of: transmitting at least one piece of information to a second terminal; receiving, from the second terminal, at least one HARQ feedback in response to the at least one piece of information; determining an ACK or NACK with respect to the at least one HARQ feedback, based on the threshold; receiving, from the second terminal, an HARQ feedback transmission history of the (Continued)

second terminal; and adjusting the threshold, based on the HARQ feedback transmission history of the second terminal and information about the HARQ feedback determined by the first terminal.

11 Claims, 23 Drawing Sheets

(56) References Cited

U.S. PATENT DOCUMENTS

| | | | |
|---|---|---|---|
| 2004/0258096 A1* | 12/2004 | Yoon | H04L 1/1692 370/522 |
| 2011/0002278 A1* | 1/2011 | Lindoff | H04L 1/1692 370/329 |
| 2013/0067293 A1 | 3/2013 | Somasundaram et al. | |
| 2017/0141903 A1 | 5/2017 | Xu et al. | |
| 2019/0159250 A1* | 5/2019 | Chiang | H04W 16/14 |
| 2020/0052831 A1* | 2/2020 | Yang | H04L 5/0094 |
| 2020/0100255 A1* | 3/2020 | Wu | H04W 4/023 |
| 2022/0046564 A1* | 2/2022 | Shimoda | H04L 1/08 |

* cited by examiner

METHOD AND APPARATUS FOR ADJUSTING THRESHOLD FOR DETERMINING HARQ FEEDBACK IN NR V2X

CROSS-REFERENCE TO RELATED APPLICATIONS

This application is the National Stage filing under 35 U.S.C. 371 of International Application No. PCT/KR2019/011299, filed on Sep. 3, 2019, which claims the benefit of U.S. Provisional Application No. 62/754,554 filed on Nov. 1, 2018, the contents of which are all hereby incorporated by reference herein in their entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g., a bandwidth, transmission power, and so on) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, in order to reduce the effect of incorrectly determining NACK feedback as ACK, a specific parameter (e.g., a threshold) may be configured to the UE. In case the transmitting UE receives HARQ feedback from the receiving UE, even if the HARQ feedback is decoded as ACK, if transmission energy (e.g., transmission power) of the HARQ feedback does not exceed a configured threshold, the transmitting UE may operate to determine the HARQ feedback as NACK. In this case, the transmitting UE having processed the HARQ feedback as NACK may perform retransmission to the receiving UE.

Meanwhile, the threshold may be fixedly configured with a certain criterion. However, if the threshold is fixedly configured, there may be a problem in that identification performance for HARQ transmission of the UE cannot be improved according to a changing situation. Accordingly, there is a need to propose a method for improving the identification performance for HARQ transmission by adaptively changing the parameters by the UE according to the situation.

Technical Solutions

In an embodiment, provided is a method for adjusting, by a first user equipment (UE), a threshold for determining a hybrid automatic repeat request (HARQ) feedback in a wireless communication system. The method may comprise: transmitting, to a second UE, at least one information; receiving, from the second UE, at least one HARQ feedback in response to the at least one information; determining that the at least one HARQ feedback is ACK or NACK based on the threshold; receiving, from the second UE, a HARQ feedback transmission history of the second UE; and adjusting the threshold, based on the HARQ feedback transmission history of the second UE and information on the HARQ feedback determined by the first UE.

In another embodiment, provided is a first user equipment (UE) configured to adjust a threshold for determining a hybrid automatic repeat request (HARQ) feedback in a wireless communication system. The first UE may comprise: a memory; a transceiver; and a processor connected to the memory and the transceiver, wherein the processor is configured to: control the transceiver to transmit, to a second UE, at least one information; control the transceiver to receive, from the second UE, at least one HARQ feedback in response to the at least one information; determine that the at least one HARQ feedback is ACK or NACK based on the threshold; control the transceiver to receive, from the second UE, a HARQ feedback transmission history of the second UE; and adjust the threshold, based on the HARQ feedback transmission history of the second UE and information on the HARQ feedback determined by the first UE.

Effects of the Disclosure

The performance of determining the HARQ feedback of the UE may be improved.

DESCRIPTION OF EXEMPLARY EMBODIMENTS

In this document, the term "I" and "," should be interpreted to indicate "and/or." For instance, the expression "A/B" may mean "A and/or B." Further, "A, B" may mean "A and/or B." Further, "AB/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
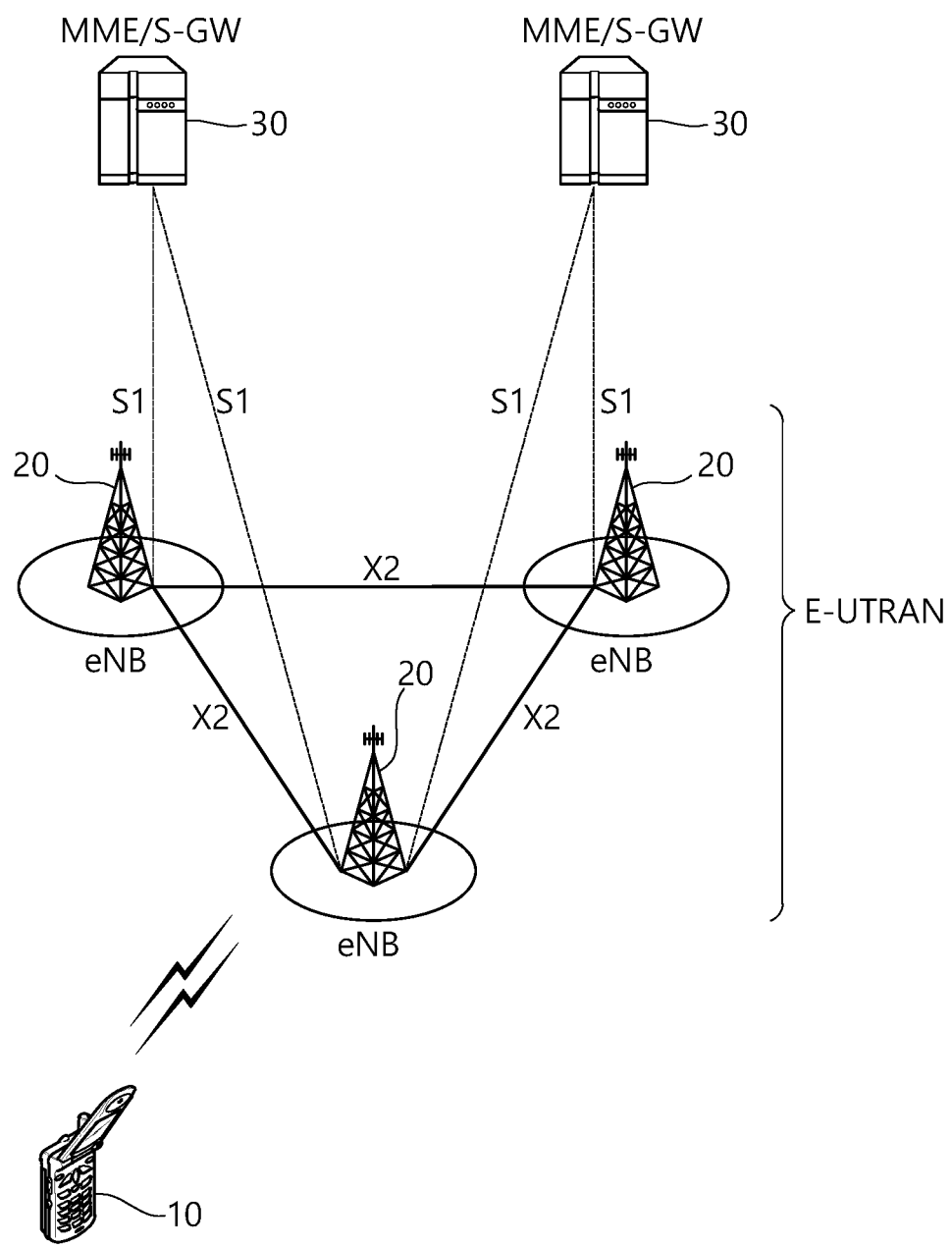
FIG. 1 shows a structure of an LTE system to which an exemplary embodiment of the present disclosure can be applied.

FIG. 1 shows a structure of an LTE system to which an exemplary embodiment of the present disclosure can be applied. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
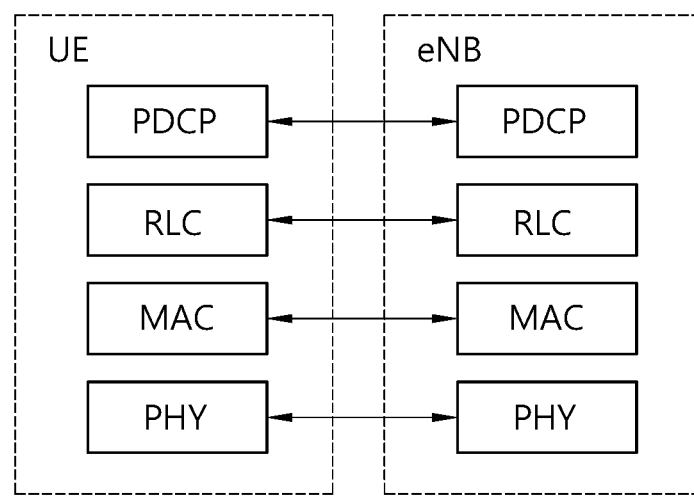
FIG. 2 shows a radio protocol architecture of a user plane to which an exemplary embodiment of the present disclosure can be applied.
Figure 3:
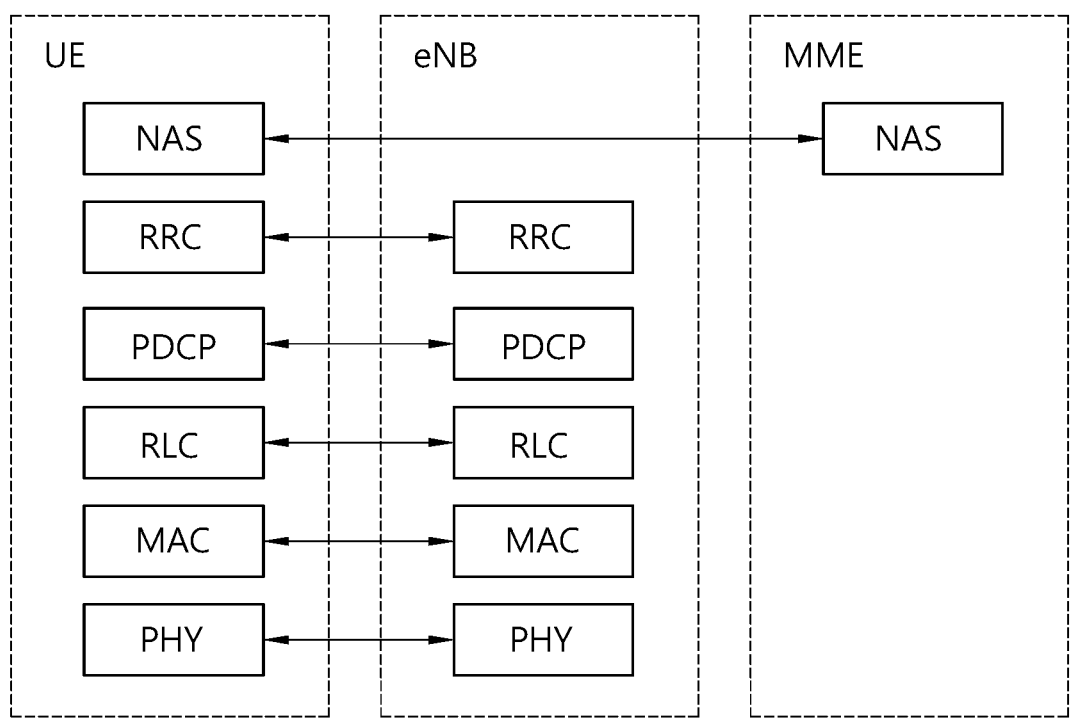
FIG. 3 shows a radio protocol architecture of a control plane to which an exemplary embodiment of the present disclosure can be applied.

FIG. 2 shows a radio protocol architecture of a user plane to which an exemplary embodiment of the present disclosure can be applied. FIG. 3 shows a radio protocol architecture of a control plane to which an exemplary embodiment of the present disclosure can be applied. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
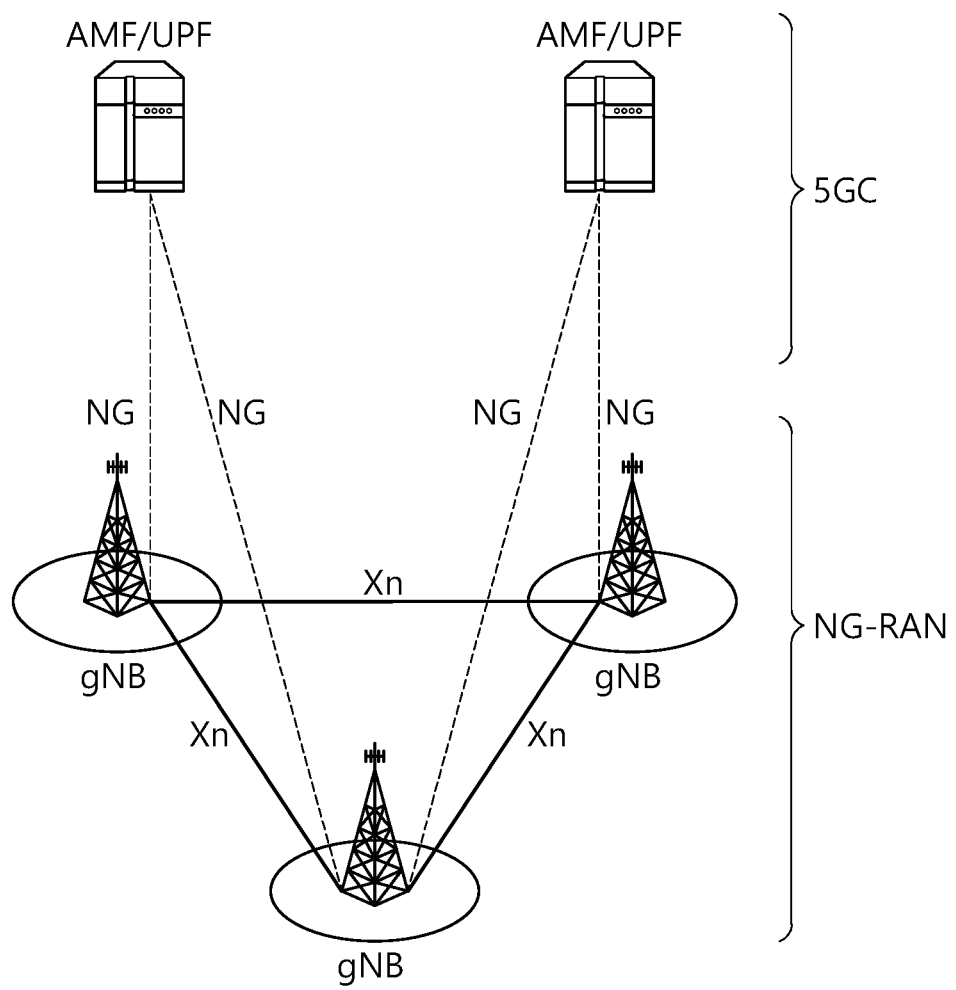
FIG. 4 shows a structure of an NR system to which an exemplary embodiment of the present disclosure can be applied.

FIG. 4 shows a structure of an NR system to which an exemplary embodiment of the present disclosure can be applied.

Referring to FIG. 4, an NG-RAN may include a gNB and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
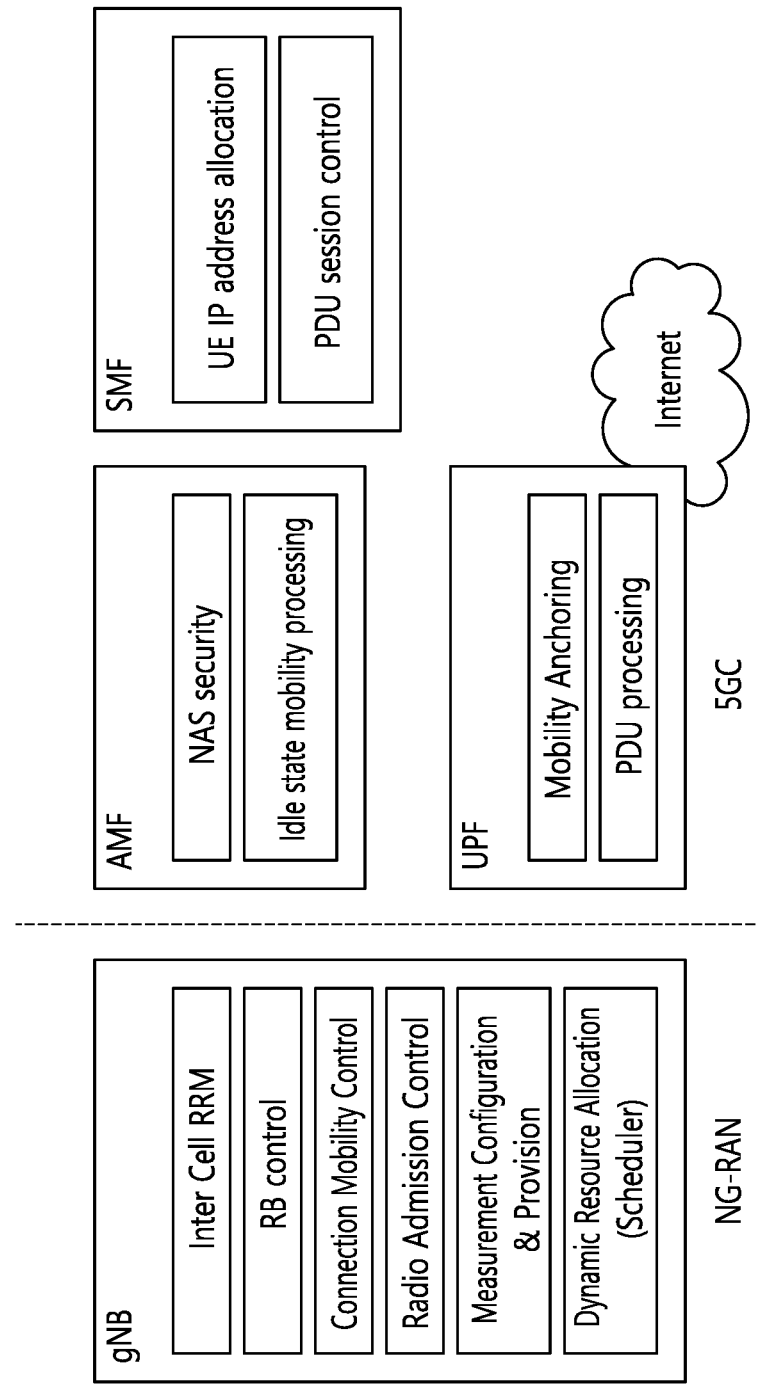
FIG. 5 shows a functional division between an NG-RAN and a 5GC to which an exemplary embodiment of the present disclosure can be applied.

FIG. 5 shows a functional division between an NG-RAN and a 5GC to which an exemplary embodiment of the present disclosure can be applied.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Meanwhile, a new RAT system such as NR may use an OFDM transmission scheme or a transmission scheme similar thereto. The new RAT system may follow OFDM parameters different from OFDM parameters of the LTE. Alternatively, the new RAT system may follow the existing LTE/LTE-A numerology, but may have a larger system bandwidth (e.g., 100 MHz). Alternatively, one cell may support a plurality of numerologies. That is, UEs operating based on different numerologies may coexist in one cell.

Figure 6:
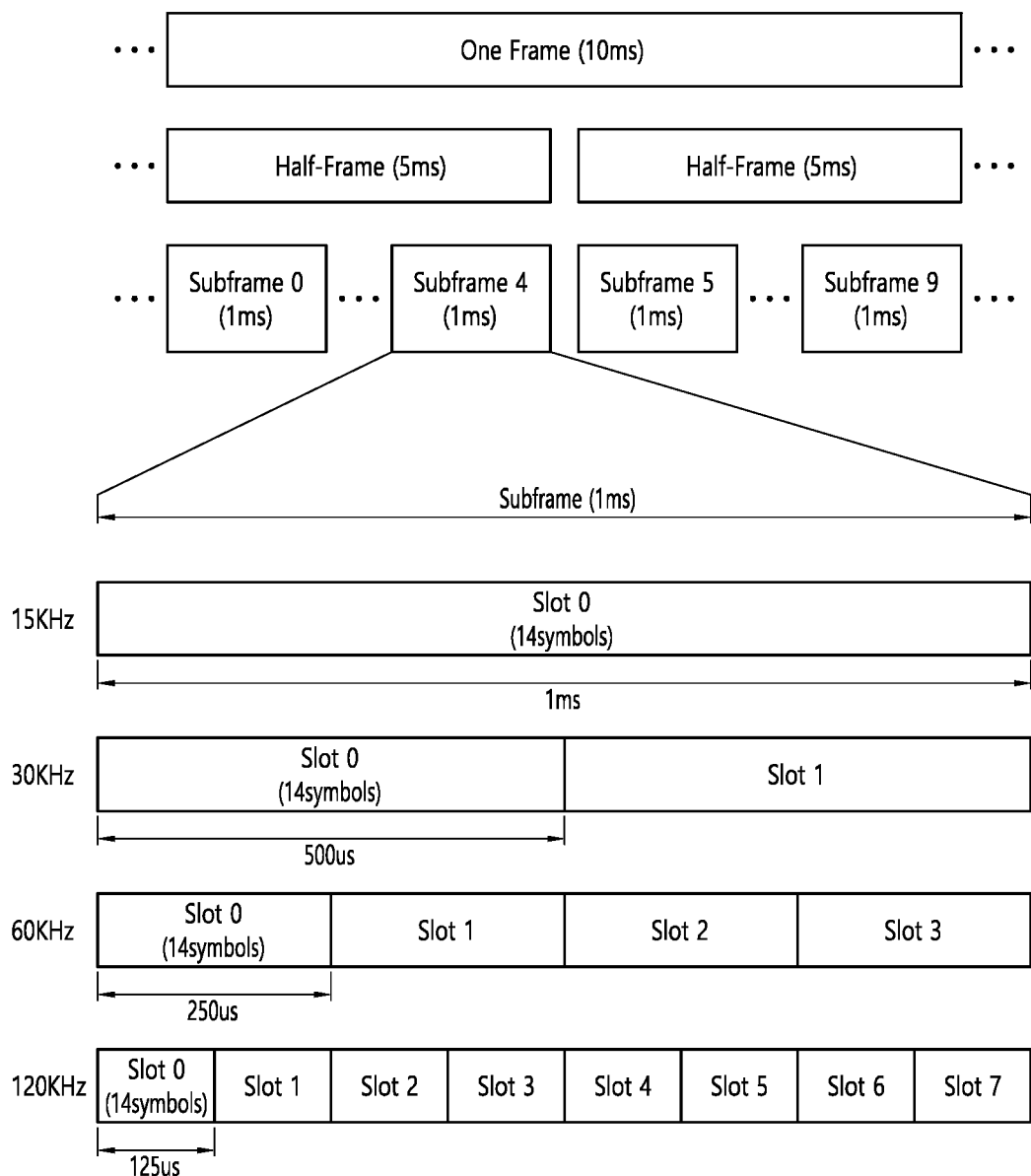
FIG. 6 shows a structure of a radio frame of an NR to which an exemplary embodiment of the present disclosure can be applied.

FIG. 6 shows a structure of a radio frame of an NR to which an exemplary embodiment of the present disclosure can be applied.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (μ), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 kHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 7:
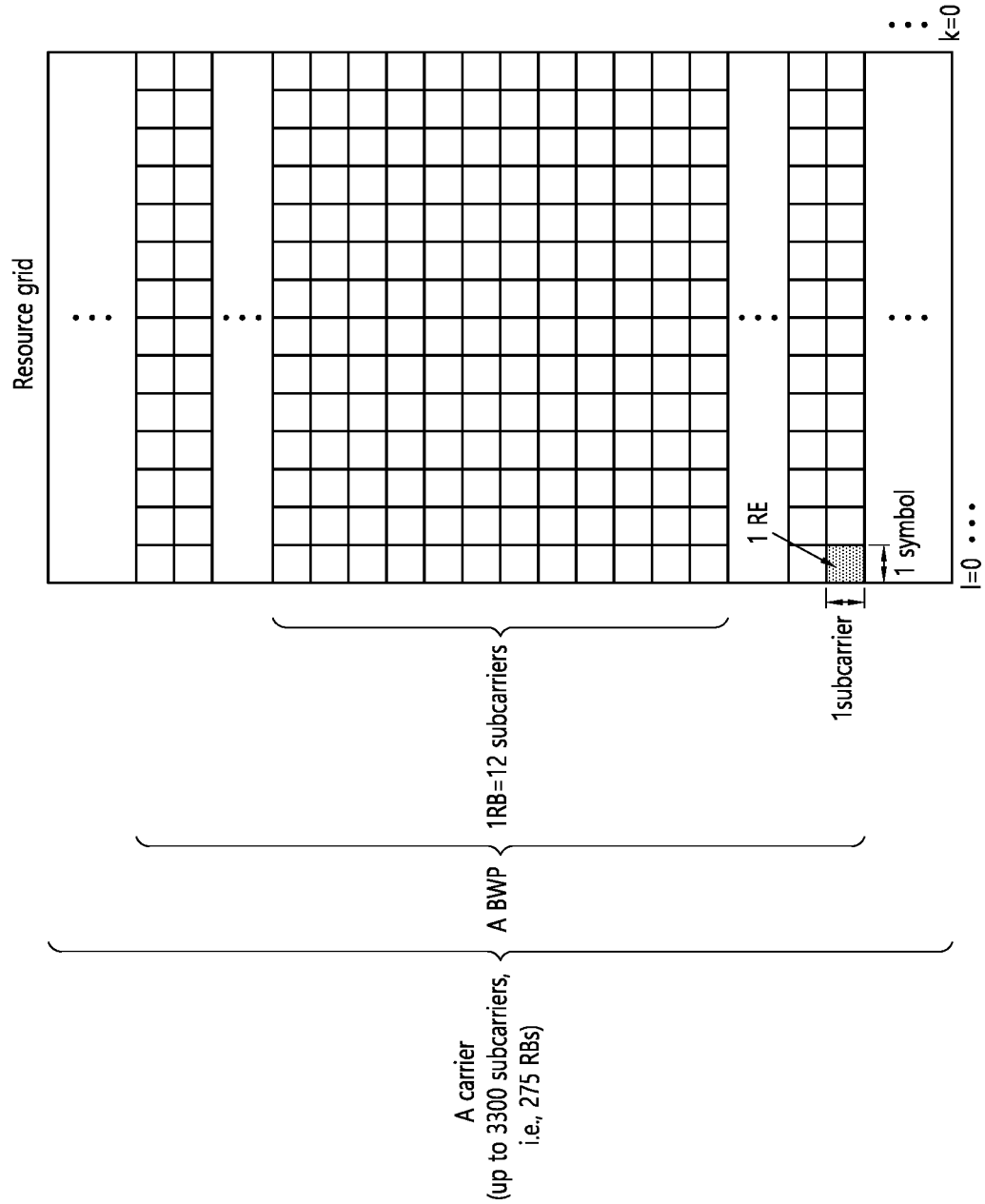
FIG. 7 shows a structure of a slot of an NR frame to which an exemplary embodiment of the present disclosure can be applied.

FIG. 7 shows a structure of a slot of an NR frame to which an exemplary embodiment of the present disclosure can be applied.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, V2X or sidelink communication will be described in detail.

Figure 8:
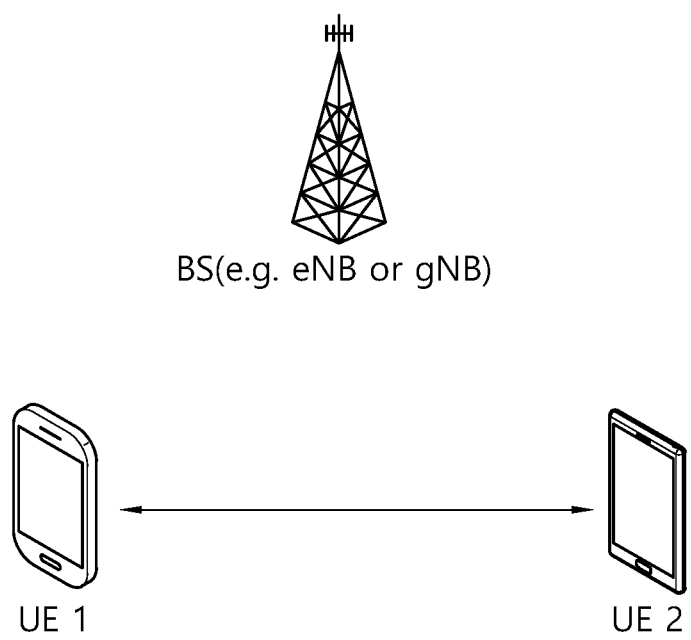
FIG. 8 shows UEs performing V2X or sidelink communication to which an exemplary embodiment of the present disclosure can be applied.

FIG. 8 shows UEs performing V2X or sidelink communication to which an exemplary embodiment of the present disclosure can be applied.

Referring to FIG. 8, in V2X/sidelink communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a sidelink signal by using the corresponding resource unit. User equipment 2 (UE2), which corresponds to a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 9:
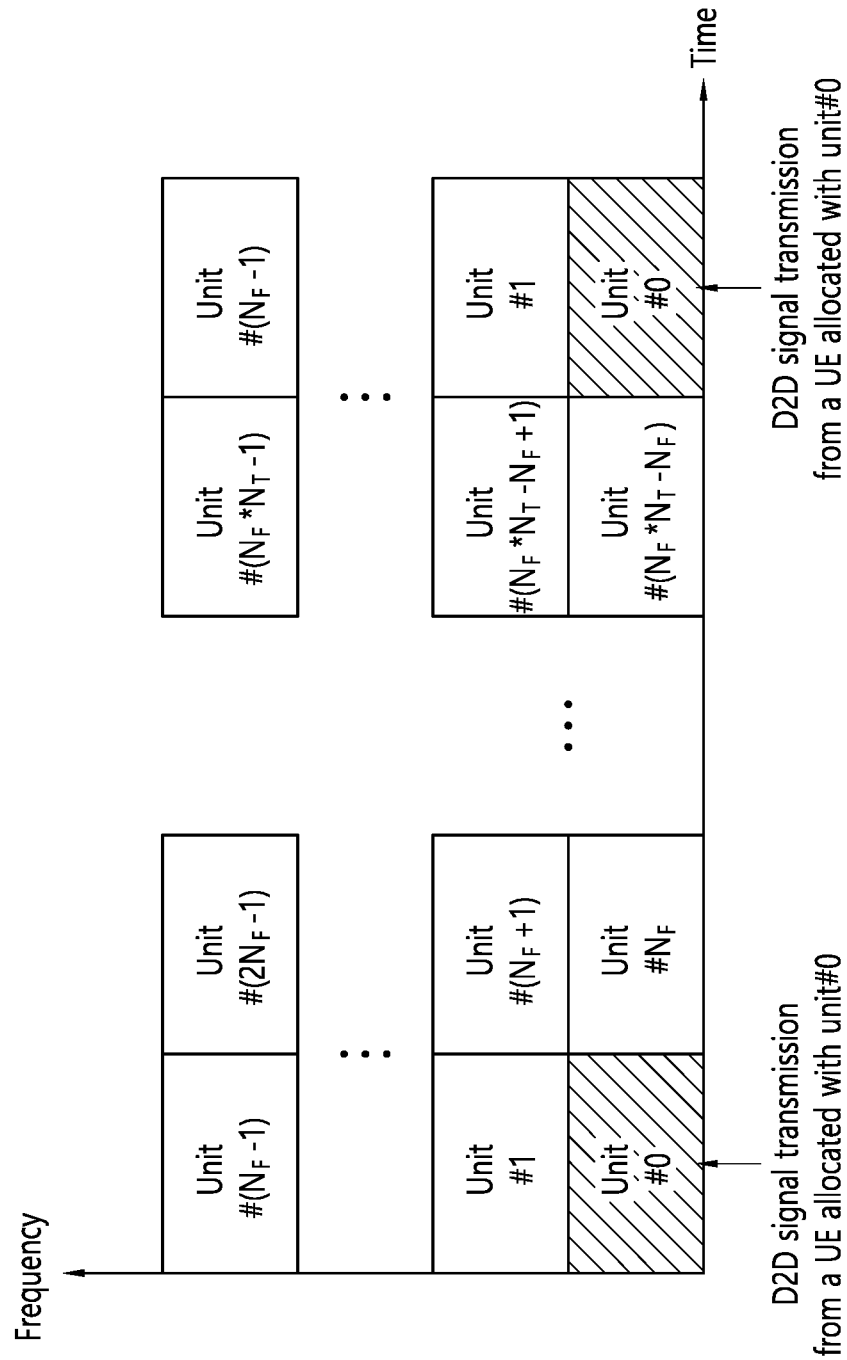
FIG. 9 shows an exemplary configuration of a resource unit to which an exemplary embodiment of the present disclosure can be applied.

FIG. 9 shows an exemplary configuration of a resource unit to which an exemplary embodiment of the present disclosure can be applied.

Referring to FIG. 9, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 9 shows an example of a case where the corresponding resource pool is repeated at a cycle of $N_T$ number of subframes.

As shown in FIG. 9, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may be a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may be a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the base station, a transmitting power intensity (or level) of a sidelink UE, and so on.

Figure 10:
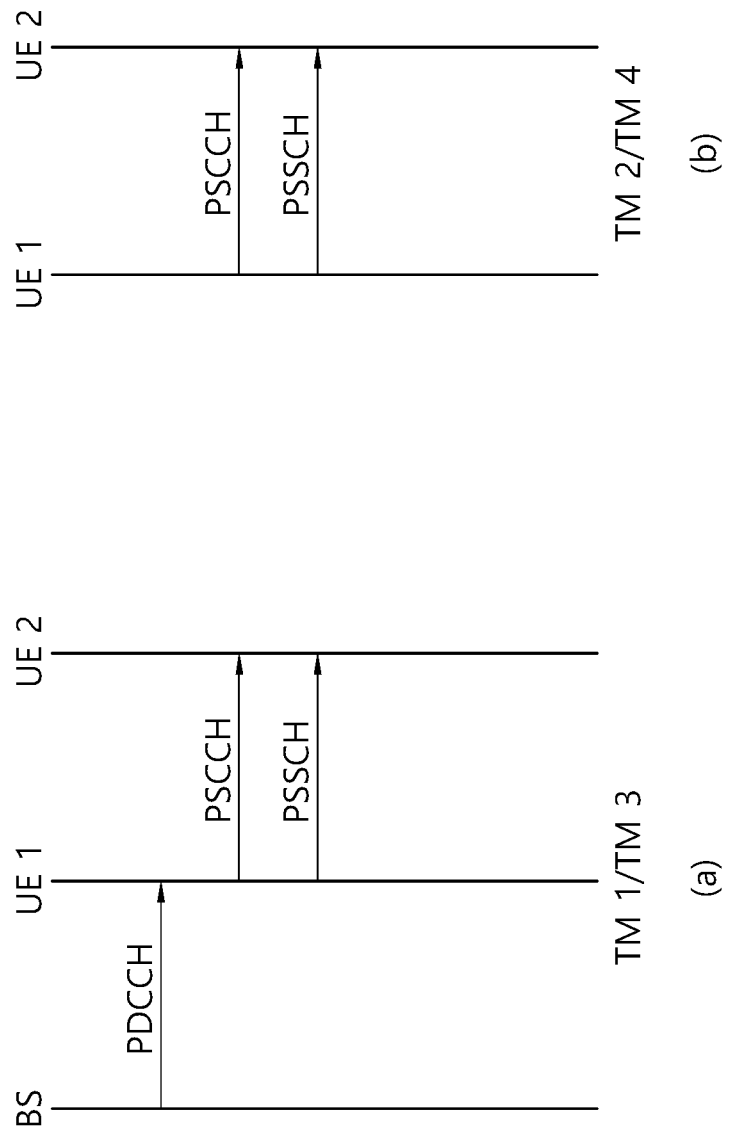
FIG. 10 shows UE operations according to a transmission mode (TM) being related to sidelink/V2X communication to which an exemplary embodiment of the present disclosure can be applied.

FIG. 10 shows UE operations according to a transmission mode (TM) being related to sidelink/V2X communication to which an exemplary embodiment of the present disclosure can be applied.

(a) of FIG. 10 represents UE operations being related to transmission mode 1 or transmission mode 3, and (b) of FIG. 10 represents UE operations being related to transmission mode 2 or transmission mode 4.

Referring to (a) of FIG. 10, in transmission modes 1/3, the base station performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). Transmission mode 1 may be applied to a sidelink communication, and transmission mode 3 may be applied to a V2X communication.

Referring to (b) of FIG. 10, in transmission modes 2/4, the UE may schedule resources on its own. More specifically, transmission mode 2 may be applied to a sidelink communication, and the UE may select a resource from a predetermined resource pool on its own and may then perform sidelink operations. Transmission mode 4 may be applied to a V2X communication, and the UE may carry out a sensing/SA decoding procedure, and so on, and select a resource within a selection window on its own and may then perform V2X operations. After transmitting the SCI to UE2 via PSCCH, UE1 may transmit SCI-based data via PSSCH. Hereinafter, the transmission mode may be abbreviated to mode.

Meanwhile, in communication between UEs (e.g., sidelink communication or V2X communication), it may be important to increase the reliability of information to be transmitted. Therefore, in order to increase the reliability of the information to be transmitted, a method of transmitting a hybrid automatic repeat request (HARQ) feedback by a UE receiving the information may be considered. In this case, since a UE transmitting the information (hereinafter, a transmitting UE) can receive the HARQ transmission fed back by a UE that attempted to receive the information (hereinafter, a receiving UE), the transmitting UE can determine whether the information transmitted by itself has been successfully transmitted. In this case, if the transmitting UE incorrectly performs the determination, unnecessary latency may occur.

Depending on how the transmitting UE incorrectly performs the determination, the delay caused may be different. For example, even though the receiving UE determines ACK as a result of decoding the information transmitted by the transmitting UE and feeds back the ACK, if the transmitting UE incorrectly determines the ACK as NACK, the physical layer of the transmitting UE may immediately perform retransmission. On the side of the receiving UE, when information that has already been successfully received from the transmitting UE is retransmitted, the receiving UE may ignore the retransmission.

On the other hand, for example, even though the receiving UE determines NACK as a result of decoding the information transmitted by the transmitting UE and feeds back the NACK, if the transmitting UE incorrectly determines the NACK as ACK, the transmitting UE may perform transmission of new information without immediately retransmitting the corresponding information. Eventually, upper layer of the receiving UE should perform a retransmission request, etc. In this process, more latency may occur when the transmitting UE incorrectly determines NACK feedback as ACK than when the transmitting UE incorrectly determines ACK feedback as NACK.

Therefore, in order to reduce the effect of incorrectly determining NACK feedback as ACK, a specific parameter (e.g., a threshold) may be configured to the UE. In case the transmitting UE receives HARQ feedback from the receiving UE, even if the HARQ feedback is decoded as ACK, if transmission energy (e.g., transmission power) of the HARQ feedback does not exceed a configured threshold, the transmitting UE may operate to determine the HARQ feedback as NACK. In this case, the transmitting UE having processed the HARQ feedback as NACK may perform retransmission to the receiving UE.

Meanwhile, the threshold may be fixedly configured with a certain criterion. For example, the threshold may be a DTX-to-ACK threshold and may be fixedly configured to 1%. However, if the threshold is fixedly configured, there may be a problem in that identification performance for HARQ transmission of the UE cannot be improved according to a changing situation. Accordingly, there is a need to propose a method for improving the identification performance for HARQ transmission by adaptively changing the parameters by the UE according to the situation. Hereinafter, according to an embodiment of the present disclosure, a method for adjusting, by the UE, the parameter for identifying HARQ feedback and an apparatus supporting the same will be described.

In the present disclosure, a proposed method and/or an embodiment may be regarded as a single proposed method, but a combination between each proposed method and/or the embodiment may also be regarded as a new method. Also, it goes without saying that the proposed method is not limited to a specific embodiment and is not limited to a specific system disclosed in present disclosure. All parameters, operations, a combination between each parameter and/or each operation, whether the corresponding parameters and/or the operations are applied, and/or whether a combination between each parameter and/or each operation is applied may be (pre-)configured through higher layer signaling and/or physical layer signaling from the base station to the UE, or may be pre-defined in a system. For example, the higher layer signaling may be application layer signaling, L3 signaling, L2 signaling, and so on. For example, physical layer signaling may be L1 signaling. Also, each of the proposed methods of the present disclosure may be defined as one operation mode, and the base station may (pre-)configure one of them to the UE through higher layer signaling and/or physical layer signaling. The base station may allow the UE to operate according to the corresponding mode. In the present disclosure, the transmission time interval (TTI) may be a unit of various lengths such as a sub-slot/a slot/a subframe, or a basic unit that is a basic transmission unit, and so on. In the present disclosure, the UE may be various types of devices such as a vehicle, a pedestrian UE, and so on. Also, in the present disclosure, matters related to operation of a UE, a base station, and/or a road side unit (RSU) may not be limited to each device type, and may be applied to different types of devices. For example, in the present disclosure, a matter described as an operation of a base station may be applied to an operation of a UE.

Figure 11:
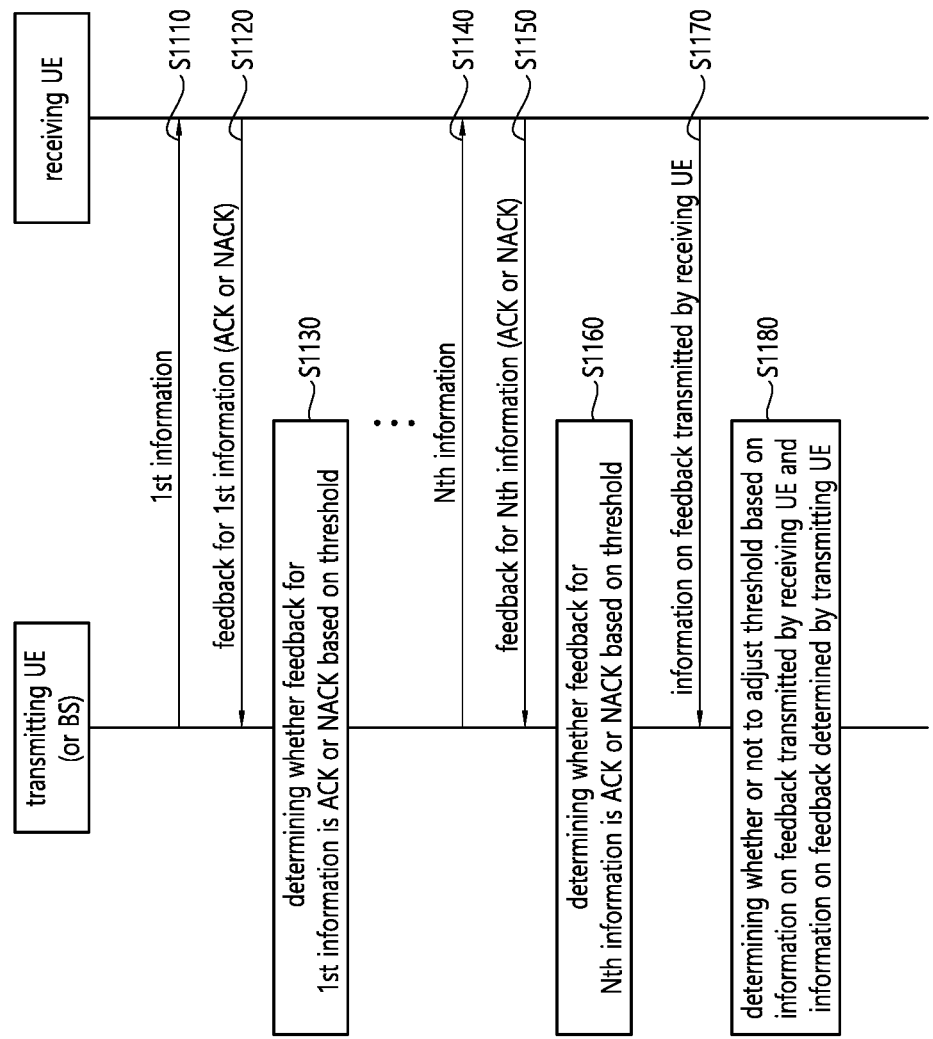
FIG. 11 shows a procedure for adjusting, by the transmitting UE, a threshold for determining HARQ feedback according to an embodiment of the present disclosure.

FIG. 11 shows a procedure for adjusting, by the transmitting UE, a threshold for determining HARQ feedback according to an embodiment of the present disclosure.

According to an embodiment of the present disclosure, the receiving UE may store history information related to transmitting the HARQ feedback, and may report the stored HARQ transmission history information to other devices (e.g., the transmitting UE or a base station), according to a request from the other devices, or periodically. The transmitting UE may adjust a parameter (e.g., a threshold) using the HARQ transmission history of the receiving UE.

Referring to FIG. 11, in step S1110, the transmitting UE may transmit first information to the receiving UE. In addition, in step S1120, the transmitting UE may receive a feedback for the first information from the receiving UE. For example, the feedback may be HARQ feedback. The feedback may indicate ACK or NACK.

In step S1130, the transmitting UE may determine whether the HARQ feedback for the first information is ACK or NACK based on the threshold. For example, even if the transmitting UE determines ACK as a result of decoding the HARQ feedback for the first information, if the transmission energy of the HARQ feedback is less than or equal to the threshold, the transmitting UE may determine that the HARQ feedback for the first information is NACK. The threshold may be (pre-)configured to the transmitting UE by the base station through higher layer signaling and/or physical layer signaling. The threshold may be (pre-)configured to the transmitting UE by another UE through higher layer signaling and/or physical layer signaling. The threshold may be pre-defined by the transmitting UE.

In step S1140, the transmitting UE may transmit N-th information to the receiving UE. In addition, in step S1150, the transmitting UE may receive the HARQ feedback for the N-th information from the receiving UE. In step S1160, the transmitting UE may determine whether the HARQ feedback for the N-th information is ACK or NACK based on the threshold. Table 3 shows an example in which the transmitting UE determines a type of the HARQ feedback transmitted by the receiving UE based on the threshold.

TABLE 3

| Transmitted information | Type of HARQ feedback decoded by transmitting UE | Transmission energy of HARQ feedback | threshold | Type of HARQ feedback determined by transmitting UE |
|---|---|---|---|---|
| 1st | NACK | 9 | 10 | NACK |
| 2nd | ACK | 9 | | NACK |
| 3rd | NACK | 12 | | NACK |
| 4th | ACK | 11 | | ACK |
| 5th | ACK | 12 | | ACK |
| 6th | ACK | 13 | | ACK |

Referring to Table 3, the transmitting UE may decode the HARQ feedback transmitted by the receiving UE in response to the second information, and the transmitting UE may determine that the HARQ feedback is ACK. However, if the transmission energy of the HARQ feedback is less than or equal to the threshold, the transmitting UE may determine that the HARQ feedback is NACK, and the transmitting UE may retransmit information to the receiving UE.

In step S1170, the transmitting UE may receive information related to the HARQ feedback transmitted by the receiving UE from the receiving UE. The information related to the HARQ feedback transmitted by the receiving UE may be a HARQ feedback transmission history of the receiving UE. In order for the receiving UE to provide information related to the HARQ feedback transmitted by the receiving UE to the transmitting UE, other UEs, or a base station, the receiving UE may store the history of the HARQ feedback transmitted by the receiving UE. The HARQ feedback transmission history of the receiving UE may be periodically transmitted to the transmitting UE, other UEs, or the base station. Alternatively, the HARQ feedback transmission history of the receiving UE may be transmitted to the transmitting UE, other UEs, or the base station according to a request of the transmitting UE, other UEs, or the base station.

Table 4 shows an example of the HARQ feedback transmission history of the receiving UE.

TABLE 4

| Information transmitted by transmitting UE to receiving UE (i.e., transmitted information) | HARQ feedback transmitted by receiving UE |
| --- | --- |
| 1st | NACK |
| 2nd | ACK |
| 3rd | NACK |
| 4th | NACK |
| 5th | NACK |
| 6th | NACK |

When the transmitting UE receives the HARQ feedback transmission history as shown in Table 4 from the receiving UE, the transmitting UE can know which HARQ feedback actually transmitted by the receiving UE for each information transmitted by the transmitting UE to the receiving UE.

In step S1180, based on the information related to the feedback transmitted by the receiving UE (i.e., the HARQ feedback transmission history of the receiving UE) and information related to feedback determined by the transmitting UE, the transmitting UE may determine whether or not to adjust the threshold.

For example, based on the HARQ feedback transmission history of the receiving UE, the transmitting UE may determine the ratio in which the transmitting UE incorrectly determines that NACK transmitted by the receiving UE is ACK. For example, the transmitting UE may determine the ratio in which the transmitting UE incorrectly determines that NACK transmitted by the receiving UE is ACK during a specific time period. If the ratio exceeds a specific ratio, the transmitting UE may increase the threshold. A plurality of the specific ratios may be configured. In this case, according to a range of the specific ratio, the transmitting UE may adjust the threshold differently. For example, the threshold may be adjusted based on an offset. Here, when adjusting the threshold, the threshold may be adjusted by an offset size (based on the history of the corresponding range) in units of a certain range. For example, as the ratio in which the transmitting UE determines that NACK transmitted by the receiving UE is ACK is higher, the transmitting UE may adjust the threshold to a larger value. The specific ratio may be (pre-)configured to the transmitting UE by the base station through higher layer signaling and/or physical layer signaling. The specific ratio may be (pre-)configured to the transmitting UE by other UEs through higher layer signaling and/or physical layer signaling. The specific ratio may be pre-defined by the transmitting UE. Alternatively, the specific ratio may be pre-defined in the system.

For example, based on the HARQ feedback transmission history of the receiving UE, the transmitting UE may determine the number of times in which the transmitting UE incorrectly determines that NACK transmitted by the receiving UE is ACK. For example, the transmitting UE may determine the number of times in which the transmitting UE incorrectly determines that NACK transmitted by the receiving UE is ACK during a specific time period. If the number of times exceeds a specific number of times, the transmitting UE may increase the threshold. A plurality of the specific number of times may be configured. In this case, according to a range of the specific number of times, the transmitting UE may adjust the threshold differently. For example, the threshold may be adjusted based on an offset. Here, when adjusting the threshold, the threshold may be adjusted by an offset size (based on the history of the corresponding range) in units of a certain range. For example, as the number of times in which the transmitting UE determines that NACK transmitted by the receiving UE is ACK is higher, the transmitting UE may adjust the threshold to a larger value. The specific number of times may be (pre-)configured to the transmitting UE by the base station through higher layer signaling and/or physical layer signaling. The specific number of times may be (pre-)configured to the transmitting UE by other UEs through higher layer signaling and/or physical layer signaling. The specific number of times may be pre-defined by the transmitting UE.

For example, in case that the transmitting UE periodically receives the HARQ feedback transmission history of the receiving UE, the transmitting UE may determine the ratio or the number of times in which the transmitting UE incorrectly determines the HARQ transmission within the corresponding period. In addition, in case that the ratio or the number of times exceeds the specific ratio or the specific number of times, the transmitting UE may change the threshold, for example, the transmitting UE may change the threshold in units of an offset based on the offset. In this case, an upper bound and/or a lower bound of the threshold may be configured. The upper bound and/or lower bound of the threshold may be (pre-)configured to the transmitting UE by the base station through higher layer signaling and/or physical layer signaling. The upper bound and/or lower bound of the threshold may be (pre-)configured to the transmitting UE by other UEs through higher layer signaling and/or physical layer signaling. The upper bound and/or lower bound of the threshold may be pre-defined by the transmitting UE. Alternatively, the upper bound and/or the lower bound of the threshold may be pre-defined in the system. The offset may be (pre-)configured to the transmitting UE by the base station through higher layer signaling and/or physical layer signaling. The offset may be (pre-)configured to the transmitting UE by other UEs through higher layer signaling and/or physical layer signaling. The offset may be pre-defined by the transmitting UE. Alternatively, the offset may be pre-defined in the system.

Table 5 shows an example in which the transmitting UE determines that NACK transmitted by the receiving UE is ACK.

TABLE 5

| Transmitted information | HARQ feedback of receiving UE | Decoding result by transmitting UE | Transmission energy of HARQ feedback | Threshold | Final decision of transmitting UE |
|---|---|---|---|---|---|
| 1st | NACK | NACK | 9 | 10 | NACK |
| 2nd | ACK | ACK | 9 | | NACK |
| 3rd | NACK | NACK | 12 | | NACK |
| 4th | NACK | ACK | 11 | | ACK |
| 5th | NACK | ACK | 12 | | ACK |
| 6th | NACK | ACK | 13 | | ACK |

Referring to Table 5, for 4th to 6th information, the transmitting UE may determine that HARQ NACK is HARQ ACK even though the receiving UE has fed back the HARQ NACK. In this case, the transmitting UE receiving the HARQ feedback transmission history from the receiving UE can know the number of times or the ratio of NACK-to-ACK errors, and the transmitting UE can increase the threshold. For example, as shown in Table 6, if the transmitting UE increases the threshold to 14, the NACK-to-ACK error may be reduced.

TABLE 6

| Transmitted information | HARQ feedback of receiving UE | Decoding result by transmitting UE | Transmission energy of HARQ feedback | Threshold | Final decision of transmitting UE |
|---|---|---|---|---|---|
| 1st | NACK | NACK | 9 | 14 | NACK |
| 2nd | ACK | ACK | 9 | | NACK |
| 3rd | NACK | NACK | 12 | | NACK |
| 4th | NACK | ACK | 11 | | NACK |
| 5th | NACK | ACK | 12 | | NACK |
| 6th | NACK | ACK | 13 | | NACK |

Optionally, for example, based on the HARQ feedback transmission history of the receiving UE, the transmitting UE may determine the number of times/the ratio in which the transmitting UE incorrectly determines that ACK transmitted by the receiving UE is NACK. For example, the transmitting UE may determine the number of times/the ratio in which the transmitting UE incorrectly determines that ACK transmitted by the receiving UE is NACK during a specific time period. If the number of times/the ratio exceeds a specific number of times/a specific ratio, the transmitting UE may decrease the threshold.

According to an embodiment of the present disclosure, the UE may adaptively adjust the threshold. Accordingly, the identification performance for HARQ feedback of the UE may be improved.

Hereinafter, according to an embodiment of the present disclosure, HARQ feedback in group-based communication will be described. For example, in case that the UE performs group-based communication, one UE may transmit information to a plurality of UEs. In this case, if each of a plurality of UEs that have received the corresponding information transmits HARQ feedback on whether or not the corresponding information is received, there may be a problem that resources for each should be configured separately. Therefore, in order to prevent the above situation, a common resource in which HARQ feedback for transmitted information is transmitted may be configured. Here, a method in which the receiving UE indicates NACK by transmitting a feedback signal on the common resource only when the reception of information fails can be considered. The transmitting UE may determine whether the transmission of the information transmitted by the transmitting UE is successful based on the energy measured in the corresponding common resource by transmission of the feedback signal. In the above operation, the transmitting UE may determine whether NACK has been transmitted based on a threshold. Therefore, the threshold needs to be adjusted so that NACK-to-ACK error can come out with an appropriate probability. However, since a plurality of UEs may transmit NACK at the same time and the transmitting UE cannot determine how many UEs transmit NACK, it may be difficult to properly configure the threshold, especially in a situation where the channel condition changes. Even in the above situation, the method proposed above can be applied. According to an embodiment of the present disclosure, the transmitting UE may receive the history of HARQ feedback from the receiving UEs, and may compare the actual reception state for each transmission with the ACK/NACK determination at that time. In addition, according to the determination result, it is possible to adjust the threshold for whether to transmit the NACK. For example, as a result of analyzing the HARQ history by the transmitting UE, if the NACK-to-ACK error is actually higher than the desired level, this means that the threshold is configured excessively high. That is, this means that, as the threshold is configured excessively high, it was determined as ACK without NACK transmission although there was actually NACK transmission. Therefore, in this case, the transmitting UE may operate by reducing the threshold.

Figure 12:
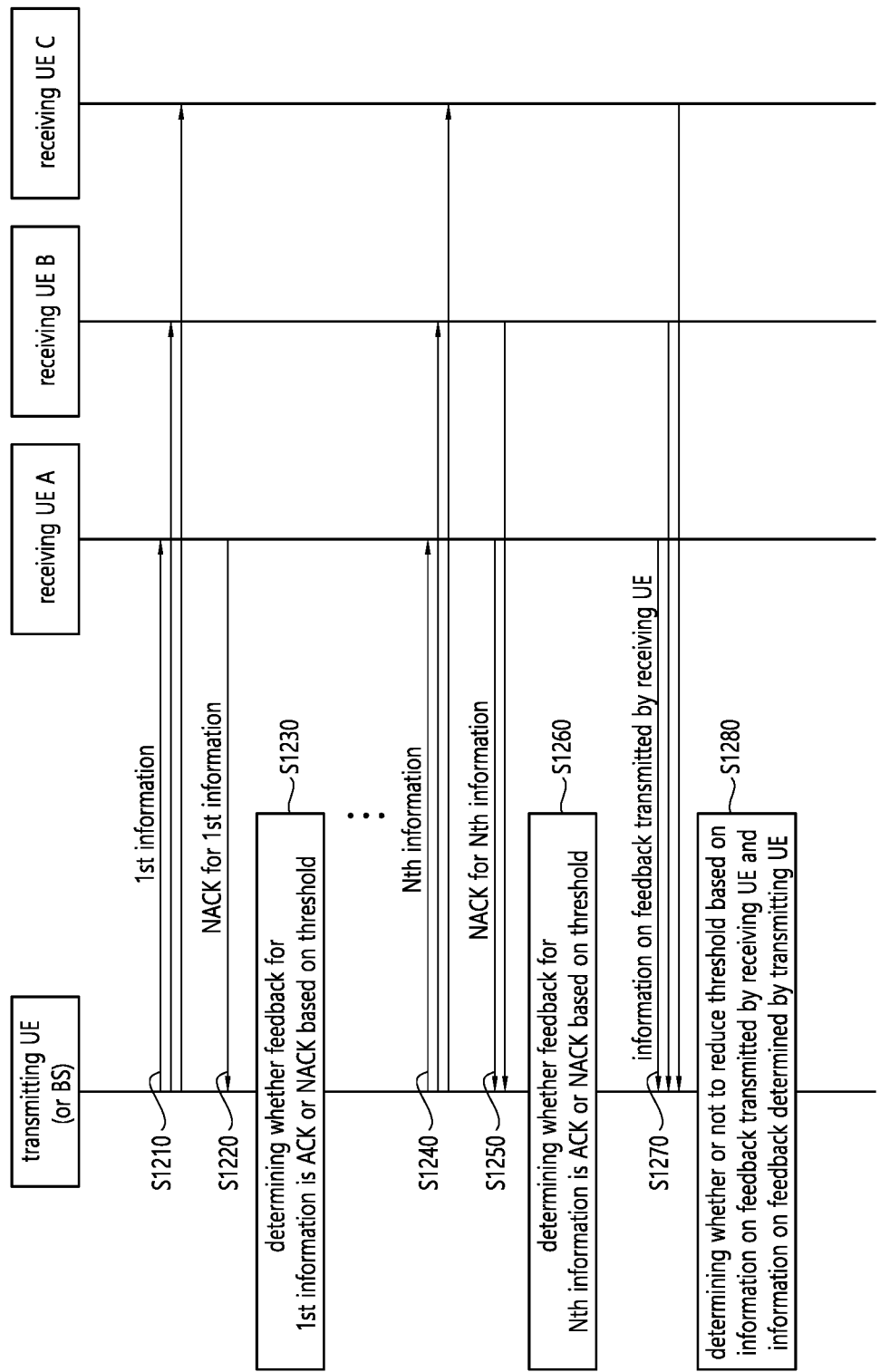
FIG. 12 shows a procedure for adjusting, by the transmitting UE, a threshold for determining HARQ feedback in a group-based communication scenario according to an embodiment of the present disclosure.

FIG. 12 shows a procedure for adjusting, by the transmitting UE, a threshold for determining HARQ feedback in a group-based communication scenario according to an embodiment of the present disclosure.

Referring to FIG. 12, in step S1210, the transmitting UE may transmit first information to one or more receiving UEs. In addition, in step S1220, the transmitting UE may receive feedback for the first information from one or more receiving UEs. The feedback may be HARQ NACK. That is, the UE which has successfully received the information may not transmit HARQ ACK to the transmitting UE. For example, the receiving UE A may transmit NACK for the first information to the transmitting UE.

In step S1230, the transmitting UE may determine whether the HARQ feedback for the first information is ACK or NACK based on the threshold. For this, the transmitting UE may measure energy for a common resource configured for HARQ feedback. If the energy larger than or equal to the threshold, the transmitting UE may determine that the HARQ feedback for the first information is NACK, and the transmitting UE may retransmit the first information to one or more receiving UEs. On the other hand, if the energy is less than or equal to the threshold, the transmitting UE may determine that the HARQ feedback for the first information is ACK, and the transmitting UE may not perform retransmission for the first information. The threshold may be (pre-)configured to the transmitting UE by the base station through higher layer signaling and/or physical layer signaling. The threshold may be (pre-)configured to the transmitting UE by other UEs through higher layer signaling and/or physical layer signaling. The threshold may be predefined by the transmitting UE.

In step S1240, the transmitting UE may transmit N-th information to one or more receiving UEs. In addition, in step S1250, the transmitting UE may receive HARQ feedback for the N-th information from one or more receiving UEs. In step S1260, the transmitting UE may determine whether the HARQ feedback for the N-th information is ACK or NACK based on the threshold. Table 7 shows an example in which the transmitting UE determines a type of HARQ feedback transmitted by the receiving UE based on the threshold.

TABLE 7

| Transmitted information | Type of HARQ feedback transmitted by receiving UE | Energy measured for a common resource | Threshold | Type of HARQ feedback determined by transmitting UE |
|---|---|---|---|---|
| 1st | NACK | 4 | 6 | ACK |
| 2nd | NACK | 8 | | NACK |

Referring to Table 7 and FIG. 12, it is assumed that the transmitting UE has received NACK from the receiving UE A in response to the first information, and that energy of 4 is measured in the common resource. In addition, it is assumed that the transmitting UE has received NACK from the receiving UEs A and B in response to the second information, and that energy of 8 is measured in the common resource. In case that the threshold is 6, the transmitting UE may determine that the HARQ feedback for the first information is ACK, while the HARQ feedback for the second information is NACK. Accordingly, the transmitting UE may not perform retransmission of the first information, which may lead to a delay of the receiving UE A.

In step S1270, the transmitting UE may receive information related to the HARQ feedback transmitted by the receiving UE from the receiving UE. The information related to the HARQ feedback transmitted by the receiving UE may be the HARQ feedback transmission history of the receiving UE. In order for the receiving UE to provide information related to the HARQ feedback transmitted by the receiving UE to the transmitting UE, other UEs, or the base station, the receiving UE may store the history of the HARQ feedback transmitted by the receiving UE. The HARQ feedback transmission history of the receiving UE may be periodically transmitted to the transmitting UE, other UEs, or the base station. Alternatively, the HARQ feedback transmission history of the receiving UE may be transmitted to the transmitting UE, other UEs, or the base station according to a request of the transmitting UE, other UEs, or the base station.

Table 8 shows an example of the HARQ feedback transmission history of the receiving UE.

TABLE 8

| Information transmitted by transmitting UE (i.e., transmitted information) | HARQ feedback transmitted by receiving UE A | HARQ feedback transmitted by receiving UE B |
|---|---|---|
| 1st | NACK | NACK |
| 2nd | NACK | |

If the transmitting UE receives the HARQ feedback transmission history as shown in Table 8 from one or more receiving UEs, the transmitting UE can know which HARQ feedback actually transmitted by the receiving UE for each information transmitted by the transmitting UE to the receiving UE.

In step S1280, based on the information related to the feedback transmitted by the receiving UE (i.e., the HARQ feedback transmission history of the receiving UE) and information related to feedback determined by the transmitting UE, the transmitting UE may determine whether or not to adjust the threshold.

For example, based on the HARQ feedback transmission history of the receiving UE, the transmitting UE may determine the ratio in which the transmitting UE incorrectly determines that NACK transmitted by the receiving UE is ACK. For example, the transmitting UE may determine the ratio in which the transmitting UE incorrectly determines that NACK transmitted by the receiving UE is ACK during a specific time period. If the ratio exceeds a specific ratio, the transmitting UE may decrease the threshold. A plurality of the specific ratios may be configured. In this case, according to a range of the specific ratio, the transmitting UE may adjust the threshold differently. For example, the threshold may be adjusted based on an offset. For example, as the ratio in which the transmitting UE determines that NACK transmitted by the receiving UE is ACK is higher, the transmitting UE may adjust the threshold to a smaller value. The specific ratio may be (pre-)configured to the transmitting UE by the base station through higher layer signaling and/or physical layer signaling. The specific ratio may be (pre-)configured to the transmitting UE by other UEs through higher layer signaling and/or physical layer signaling. The specific ratio may be pre-defined by the transmitting UE.

For example, based on the HARQ feedback transmission history of the receiving UE, the transmitting UE may determine the number of times in which the transmitting UE incorrectly determines that NACK transmitted by the receiving UE is ACK. For example, the transmitting UE may determine the number of times in which the transmitting UE incorrectly determines that NACK transmitted by the receiving UE is ACK during a specific time period. If the number of times exceeds a specific number of times, the transmitting UE may decrease the threshold. A plurality of the specific number of times may be configured. In this case, according to a range of the specific number of times, the transmitting UE may adjust the threshold differently. For example, the threshold may be adjusted based on an offset. For example, as the number of times in which the transmitting UE determines that NACK transmitted by the receiving UE is ACK is higher, the transmitting UE may adjust the threshold to a smaller value. The specific number of times may be (pre-)configured to the transmitting UE by the base station through higher layer signaling and/or physical layer signaling. The specific number of times may be (pre-)configured to the transmitting UE by other UEs through higher layer signaling and/or physical layer signaling. The specific number of times may be pre-defined by the transmitting UE.

For example, in case that the transmitting UE periodically receives the HARQ feedback transmission history of the receiving UE, the transmitting UE may determine the ratio or the number of times in which the transmitting UE incorrectly determines the HARQ transmission within the corresponding period. In addition, in case that the ratio or the number of times exceeds the specific ratio or the specific number of times, the transmitting UE may change the threshold in units of an offset based on the offset. In this case, an upper bound and/or a lower bound of the threshold may be configured. The offset may be (pre-)configured to the transmitting UE by the base station through higher layer signaling and/or physical layer signaling. The offset may be (pre-)configured to the transmitting UE by other UEs through higher layer signaling and/or physical layer signaling. The offset may be pre-defined by the transmitting UE.

For example, the transmitting UE may change the threshold of Table 7 (i.e., 6) to the threshold of Table 9 (i.e., 3). Therefore, as shown in Table 9, the probability of a NACK-to-ACK error can be reduced.

In step S1350, the first UE may adjust the threshold, based on the HARQ feedback transmission history of the second UE and information on the HARQ feedback determined by the first UE.

For example, the threshold may be adjusted based on a ratio in which the first UE determines that NACK transmitted by the second UE is ACK. The threshold may be adjusted to a large value if the ratio in which the first UE determines that NACK transmitted by the second UE is ACK is greater than or equal to a specific value. As the ratio in which the first UE determines that NACK transmitted by the second UE is ACK is higher, the threshold may be adjusted to a larger value.

For example, the threshold may be adjusted based on a number of times in which the first UE determines that NACK transmitted by the second UE is ACK during a specific time period. The threshold may be adjusted to a large value if the number of times in which the first UE determines that NACK transmitted by the second UE is ACK is greater than or equal to a specific value. As the number of times in which the first UE determines that NACK transmitted by the second UE is ACK is higher, the threshold may be adjusted to a larger value.

For example, the threshold may be adjusted based on the ratio/the number of times in which the first UE incorrectly determines the HARQ feedback transmitted by the second UE. The threshold may be adjusted to a large value if the ratio/the number of times in which the first UE incorrectly determines the HARQ feedback transmitted by the second UE is greater than or equal to a specific value. As the ratio/the number of times in which the first UE incorrectly

TABLE 9

| Transmitted information | Type of HARQ feedback transmitted by receiving UE | Energy measured for a common resource | Threshold | Type of HARQ feedback determined by transmitting UE |
|---|---|---|---|---|
| 1st | NACK | 4 | 3 | NACK |
| 2nd | NACK | 8 |  | $\overline{\text{NACK}}$ |

According to an embodiment of the present disclosure, in groupcast communication, the UE may adaptively adjust the threshold. Accordingly, the identification performance for HARQ feedback of the UE may be improved.

Figure 13:
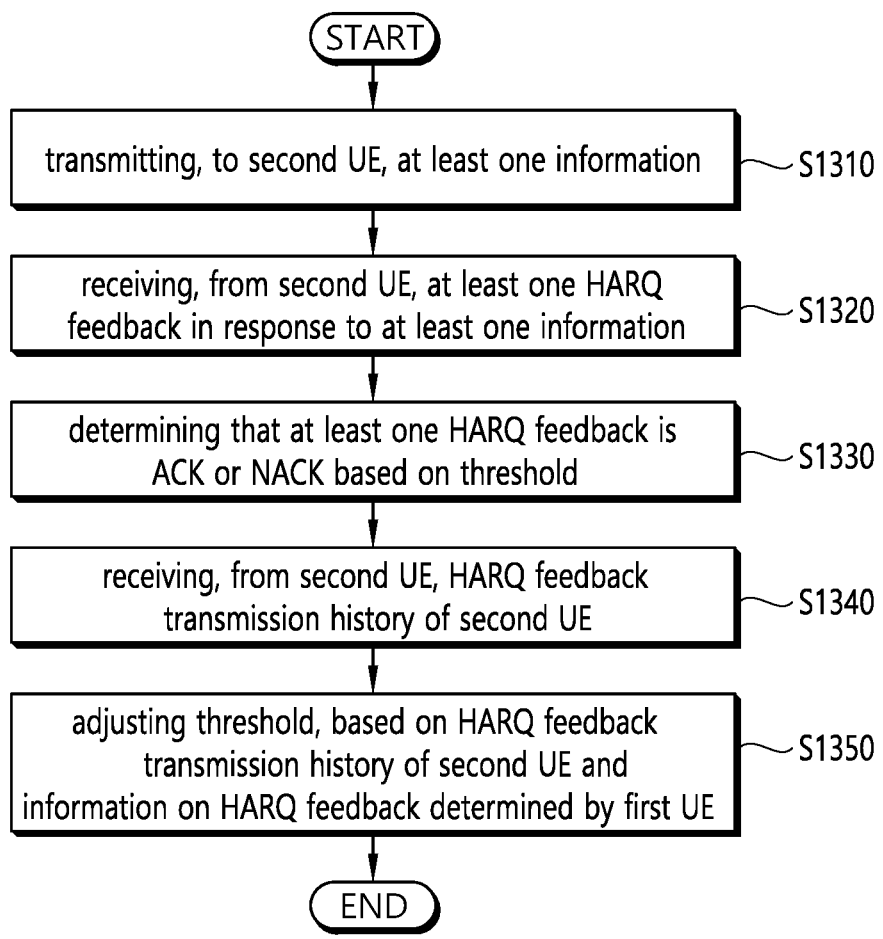
FIG. 13 shows a method for a UE to adjust a threshold for determining HARQ feedback according to an embodiment of the present disclosure.

FIG. 13 shows a method for a UE to adjust a threshold for determining HARQ feedback according to an embodiment of the present disclosure.

Referring to FIG. 13, in step S1310, a first UE may transmit, to a second UE, at least one information.

In step S1320, the first UE may receive, from the second UE, at least one HARQ feedback in response to the at least one information.

In step S1330, the first UE may determine that the at least one HARQ feedback is ACK or NACK based on the threshold. The threshold may be received from a base station. The threshold may be pre-configured by the first UE. The HARQ feedback may be determined as NACK, if signal strength of the HARQ feedback received from the second UE is less than or equal to the threshold.

In step S1340, the first UE may receive, from the second UE, a HARQ feedback transmission history of the second UE. The HARQ feedback transmission history of the second UE may be received from the second UE based on a request of the first UE. The HARQ feedback transmission history of the second UE may be periodically received from the second UE.

determines the HARQ feedback transmitted by the second UE is higher, the threshold may be adjusted to a larger value.

For example, the threshold may be adjusted based on the ratio in which the first UE determines that ACK transmitted by the second UE is NACK. The threshold may be adjusted based on the number of times in which the first UE determines that ACK transmitted by the second UE is NACK during a specific time period.

The threshold may be adjusted between a maximum threshold and a minimum threshold.

According to an embodiment of the present disclosure, in case that the HARQ feedback operation is applied in communication between UE, the transmitting UE that has transmitted information can determine whether or not the transmission of the information transmitted by the transmitting UE is successful through HARQ transmission fed back by the receiving UE. In this case, the transmitting UE may adaptively change the applied parameters (e.g., criteria for determining HARQ ACK, NACK, and DTX) according to the situation. For example, the receiving UE may report the HARQ transmission history information of the receiving UE to other UEs (or base station) periodically or at the request of other UEs (or base station), and UE(s) (or base station(s)) receiving the corresponding information may change the HARQ transmission related parameter according to the corresponding information.

The proposed method may be applied to the apparatus described below. For example, the wireless device (100) of FIG. 15 may be a first UE, and the wireless device (200) of FIG. 15 may be a second UE. The first UE may include at least one processor such as the processor (102), at least one memory such as the memory (104), and at least one transceiver such as the transceiver (106). Further, the second UE may include at least one processor such as the processor (202), at least one memory such as the memory (204), and at least one transceiver such as the transceiver (206).

First, the processor (102) of the first UE may control the transceiver (106) to transmit, to a second UE, at least one information. Further, the processor (102) of the first UE may control the transceiver (106) to receive, from the second UE, at least one HARQ feedback in response to the at least one information. Further, the processor (102) of the first UE may determine that the at least one HARQ feedback is ACK or NACK based on the threshold. Further, the processor (102) of the first UE may control the transceiver (106) to receive, from the second UE, a HARQ feedback transmission history of the second UE. Further, the processor (102) of the first UE may adjust the threshold, based on the HARQ feedback transmission history of the second UE and information on the HARQ feedback determined by the first UE.

Hereinafter, an apparatus to which the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
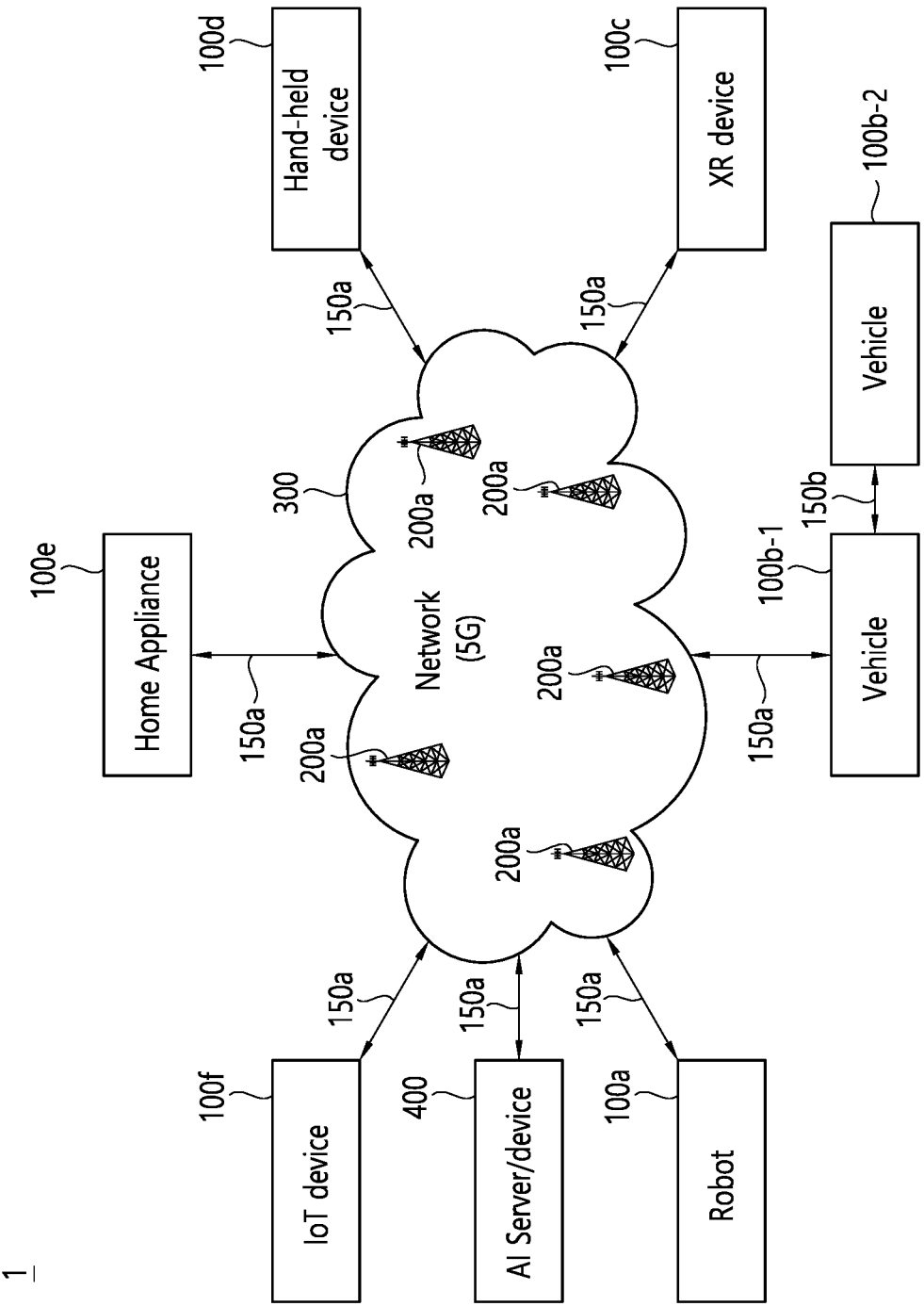
FIG. 14 shows a communication system (1) applied to the present disclosure.

FIG. 14 shows a communication system (1) applied to the present disclosure.

Referring to FIG. 14, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200a). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200a)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b) may be established between the wireless devices (100a~100f)/BS (200a), or BS (200a)/wireless devices (100a~100f). Herein, the wireless communication/connections (150a, 150b) may be established through various RATs (e.g., 5G NR) such as uplink/downlink communication (150a), sidelink communication (150b) (or, D2D communication), or inter BS communication (e.g., relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
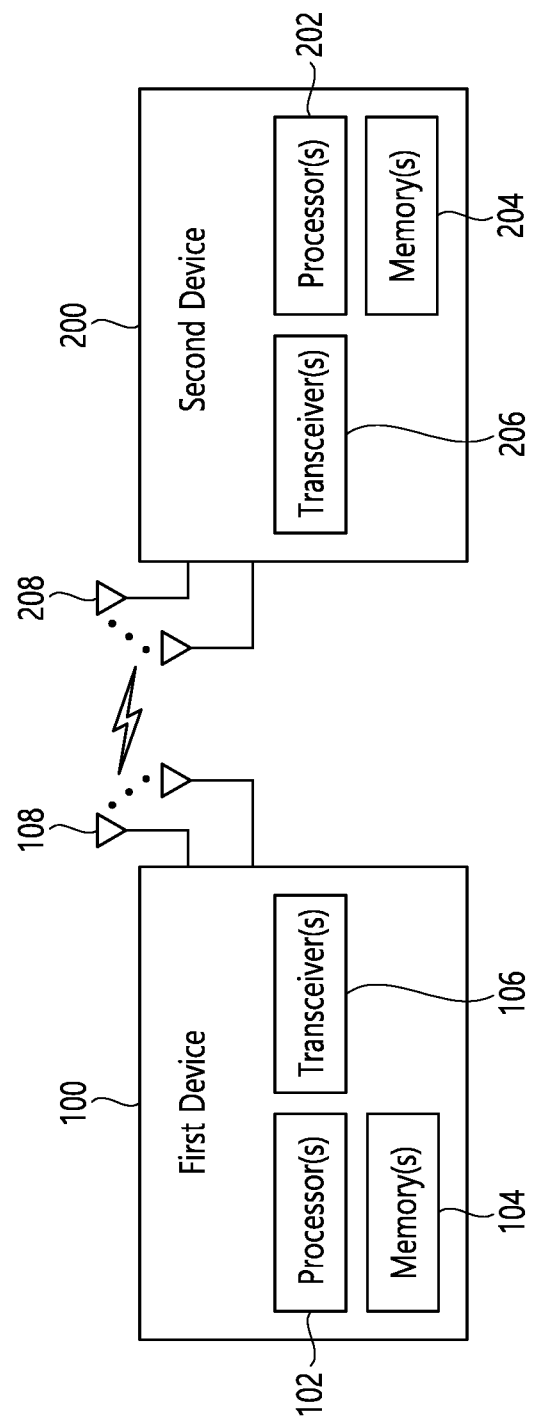
FIG. 15 shows wireless devices applicable to the present disclosure.

FIG. 15 shows wireless devices applicable to the present disclosure.

Referring to FIG. 15, a first wireless device (100) and a second wireless device (200) may transmit radio signals through a variety of RATs (e.g., LTE and NR).

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Units (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 16:
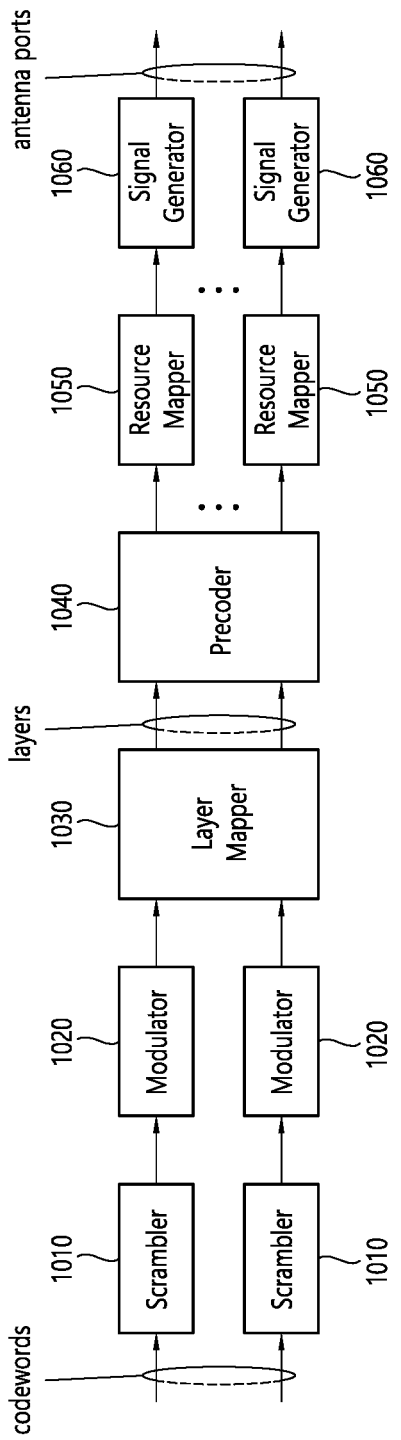
FIG. 16 shows a signal process circuit for a transmission signal.

FIG. 16 shows a signal process circuit for a transmission signal.

Referring to FIG. 16, a signal processing circuit (1000) may include scramblers (1010), modulators (1020), a layer mapper (1030), a precoder (1040), resource mappers (1050), and signal generators (1060). An operation/function of FIG. 16 may be performed, without being limited to, the processors (102, 202) and/or the transceivers (106, 206) of FIG. 15. Hardware elements of FIG. 16 may be implemented by the processors (102, 202) and/or the transceivers (106, 206) of FIG. 15. For example, blocks 1010~1060 may be implemented by the processors (102, 202) of FIG. 15. Alternatively, the blocks 1010 to 1050 may be implemented by the processors (102, 202) of FIG. 15 and the block 1060 may be implemented by the transceivers (106, 206) of FIG. 15.

Codewords may be converted into radio signals via the signal processing circuit (1000) of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 16. For example, the wireless devices (e.g., 100, 200 of FIG. 15) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 17:
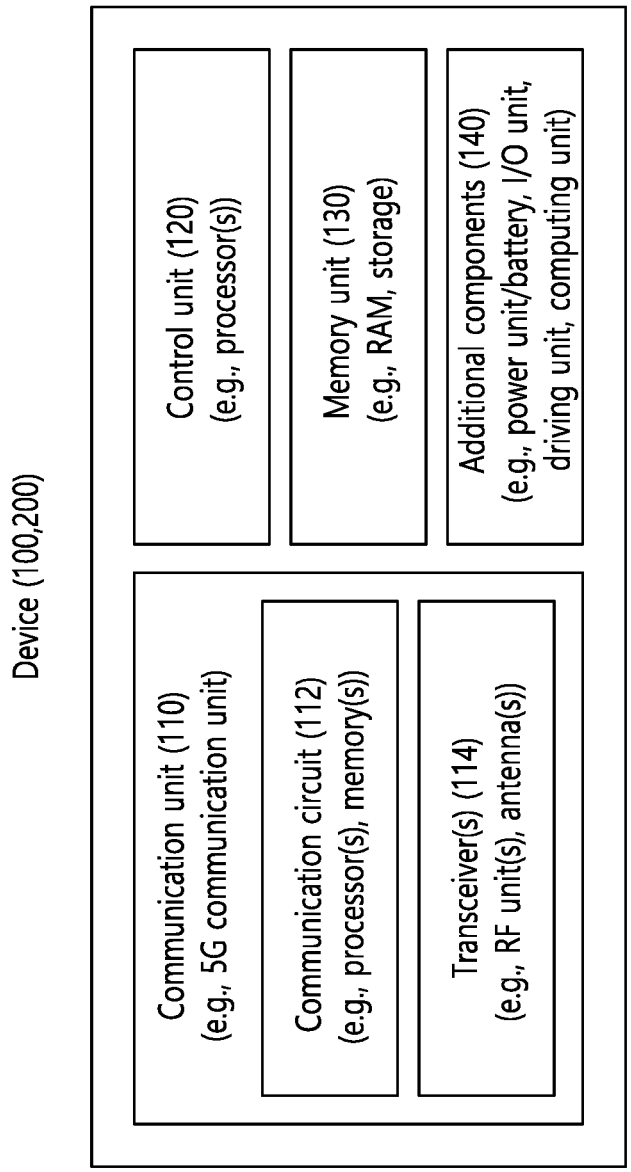
FIG. 17 shows another example of a wireless device applied to the present disclosure.

FIG. 17 shows another example of a wireless device applied to the present disclosure. The wireless device may be implemented in various forms according to a use-case/service (refer to FIG. 14 and FIGS. 18 to 23).

Referring to FIG. 17, wireless devices (100, 200) may correspond to the wireless devices (100, 200) of FIG. 15 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 15. For example, the transceiver(s) (114) may include the one or more transceivers (106, 206) and/or the one or more antennas (108, 208) of FIG. 15. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 14), the vehicles (100b-1, 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, and so on. The wireless device may be used in a mobile or fixed place according to a use-example/service.

In FIG. 17, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Figure 18:
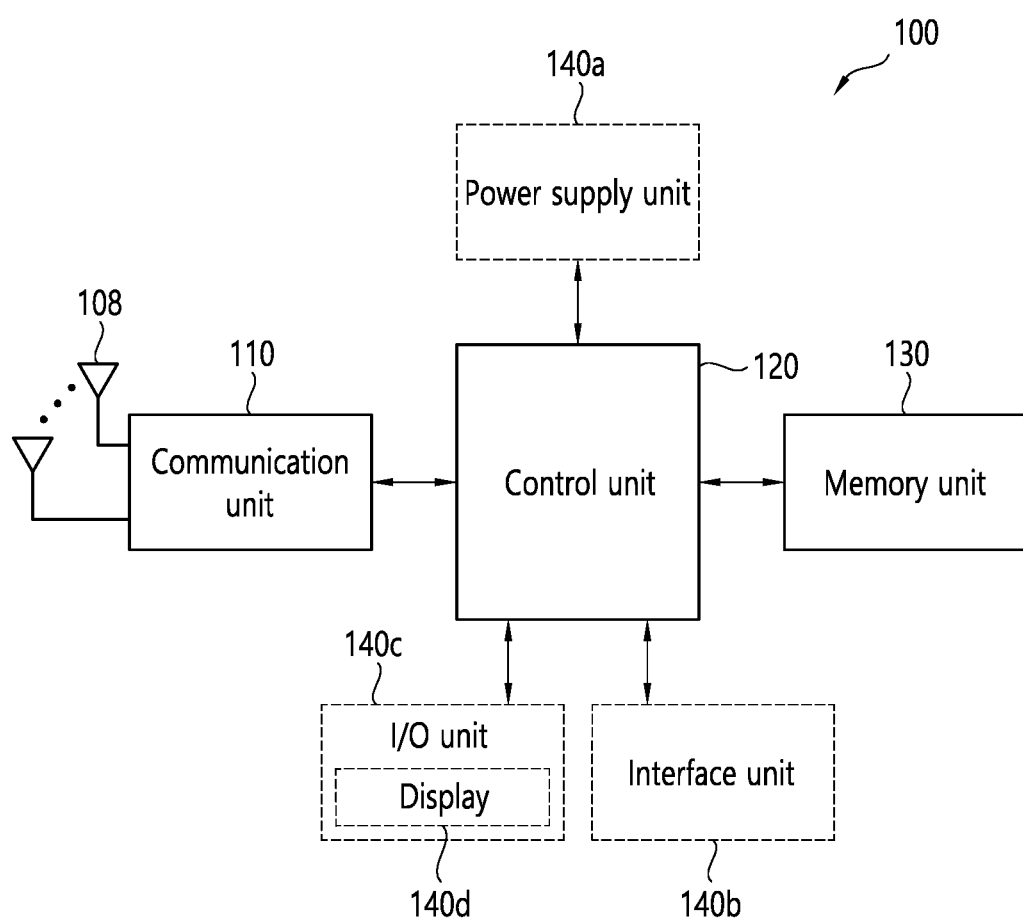
FIG. 18 shows a hand-held device applied to the present disclosure.

FIG. 18 shows a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 18, a hand-held device (100) may include an antenna unit (108), a communication unit (110), a control unit (120), a memory unit (130), a power supply unit (140*a*), an interface unit (140*b*), and an I/O unit (140*c*). The antenna unit (108) may be configured as a part of the communication unit (110). Blocks 110~130/140*a*~140*c* correspond to the blocks 110~130/140 of FIG. 17, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140*a*) may supply power to the hand-held device (100) and include a wired/wireless charging circuit, a battery, and so on. The interface unit (140*b*) may support connection of the hand-held device (100) to other external devices. The interface unit (140*b*) may include various ports (e.g., an audio I/O port and a video I/O port) for connection with external devices. The I/O unit (140*c*) may input or output video information/signals, audio information/signals, data, and/or information input by a user. The I/O unit (140*c*) may include a camera, a microphone, a user input unit, a display unit (140*d*), a speaker, and/or a haptic module.

As an example, in the case of data communication, the I/O unit (140*c*) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140*c*).

Figure 19:
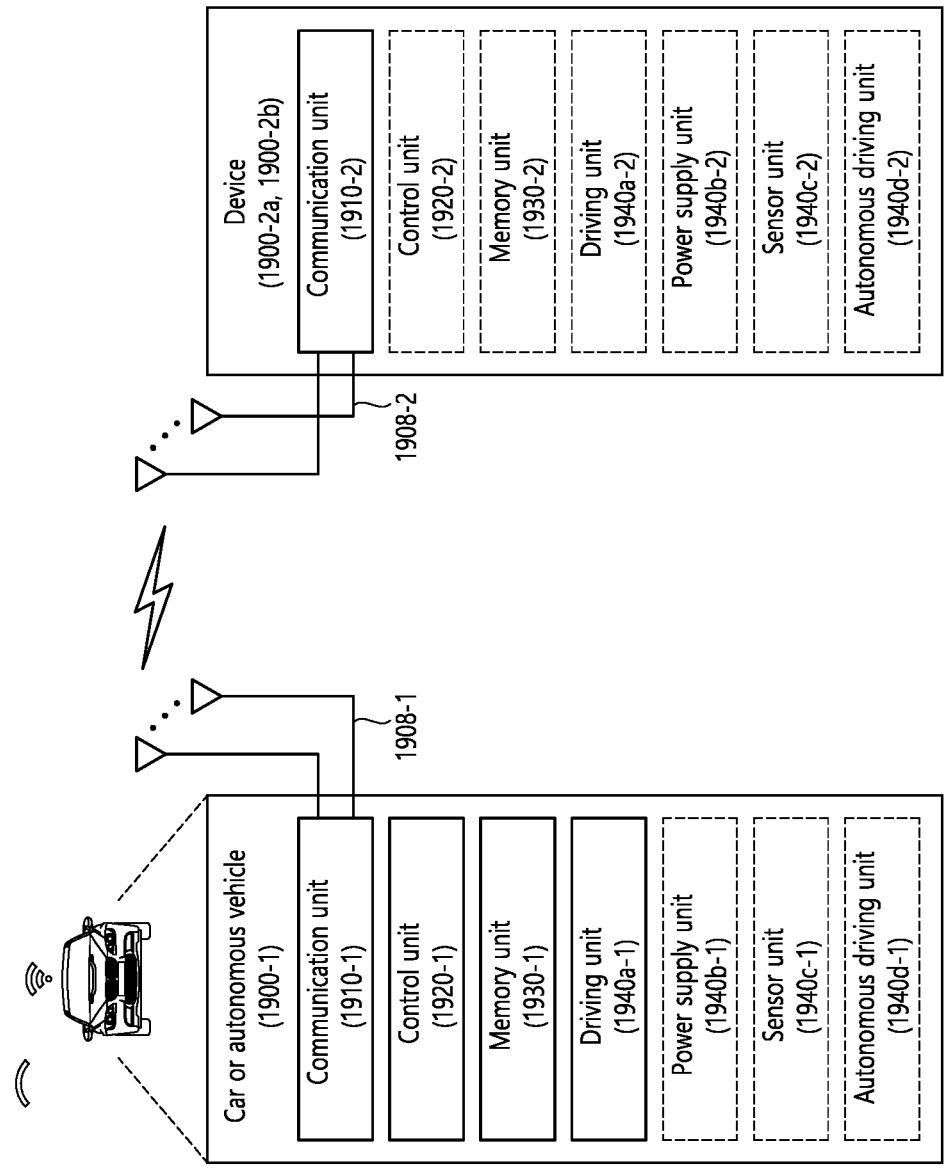
FIG. 19 shows a vehicle or an autonomous driving vehicle applied to the present disclosure.

FIG. 19 shows a vehicle or an autonomous driving vehicle applied to the present disclosure. The vehicle or autonomous driving vehicle may be implemented by a mobile robot, a car, a train, a manned/unmanned Aerial Vehicle (AV), a ship, and so on.

Referring to FIG. 19, a car or an autonomous vehicle (1900-1) may include an antenna unit (1908-1), a communication unit (1910-1), a control unit (1920-1), a driving unit (1940*a*-1), a power supply unit (1940*b*-1), a sensor unit (1940*c*-1), and an autonomous driving unit (1940*d*-1). The antenna unit (1908-1) may be configured as a part of the communication unit (1910-1). Meanwhile, referring to FIG. 19, devices (1900-2*a*, 1900-2*b*) may correspond to the wireless devices (100, 200) of FIG. 17. For example, each of the wireless devices (1900-2*a*, 1900-2*b*) may include a communication unit (1910-2), a control unit (1920-2), a memory unit (1930-2), and additional components (1940*a*-2, 1940*b*-2, 1940*c*-2, and 1940*d*-2). The blocks 1910-2/1920-2/1930-2/1940*a*-2-1940*d*-2 correspond to the blocks 110/120/130/140 of FIG. 17, respectively. Furthermore, each of the devices (1900-2*a*, 1900-2*b*) may also include an antenna unit (1908-2) and the antenna unit (1908-2) may configured as a part of the communication unit (1910-2).

The communication unit (1910-1) may transmit and receive signals (e.g., data and control signals) to and from external devices such as other vehicles, BSs (e.g., gNBs and road side units), and servers. The control unit (1920-1) may perform various operations by controlling elements of the vehicle or the autonomous driving vehicle (1900-1). The control unit (1920-1) may include an Electronic Control Unit (ECU). The driving unit (1940*a*-1) may cause the vehicle or the autonomous driving vehicle (1900-1) to drive on a road. The driving unit (1940*a*-1) may include an engine, a motor, a powertrain, a wheel, a brake, a steering device, and so on. The power supply unit (1940*b*-1) may supply power to the vehicle or the autonomous driving vehicle (1900-1) and include a wired/wireless charging circuit, a battery, and so on. The sensor unit (1940*c*-1) may obtain a vehicle state, ambient environment information, user information, and so on. The sensor unit (1940*c*-1) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (1940*d*-1) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (1910-1) may receive map data, traffic information data, and so on, from an external server. The autonomous driving unit (1940*d*-1) may generate an autonomous driving path and a driving plan from the obtained data. The control unit (1920-1) may control the driving unit (1940a-1) such that the vehicle or the autonomous driving vehicle (1900-1) may move along the autonomous driving path according to the driving plan (e.g., speed/direction control). In the middle of autonomous driving, the communication unit (1910-1) may aperiodically/periodically obtain recent traffic information data from the external server and obtain surrounding traffic information data from neighboring vehicles. In the middle of autonomous driving, the sensor unit (1940c-1) may obtain a vehicle state and/or surrounding environment information. The autonomous driving unit (1940d-1) may update the autonomous driving path and the driving plan based on the newly obtained data/information. The communication unit (1910-1) may transfer information on a vehicle position, the autonomous driving path, and/or the driving plan to the external server. The external server may predict traffic information data using AI technology, and so on, based on the information collected from vehicles or autonomous driving vehicles and provide the predicted traffic information data to the vehicles or the autonomous driving vehicles.

Figure 20:
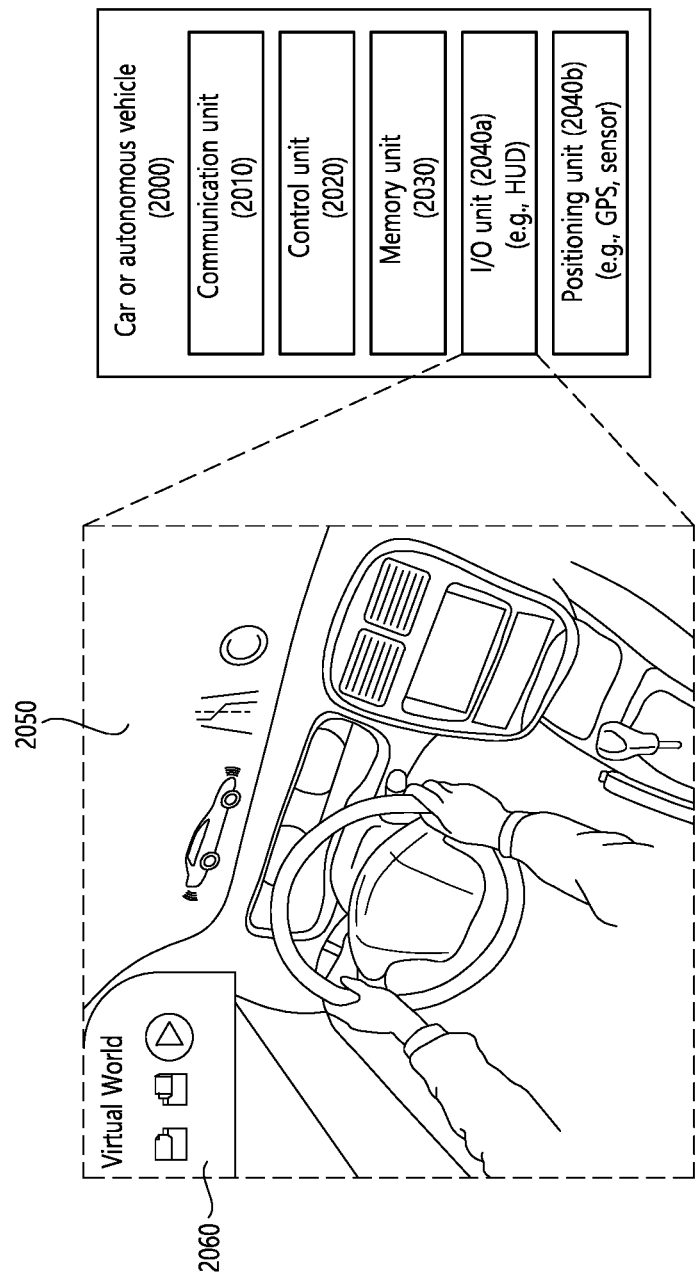
FIG. 20 shows a vehicle applied to the present disclosure.

FIG. 20 shows a vehicle applied to the present disclosure. The vehicle may be implemented as a transport means, an aerial vehicle, a ship, and so on.

Referring to FIG. 20, a car or an autonomous vehicle (2000) may include a communication unit (2010), a control unit (2020), a memory unit (2030), an I/O unit (2040a), and a positioning unit (2040b). Herein, the blocks 2010/2020/2030/ correspond to blocks 1910-1/1920-1/1930-1 of FIG. 19.

The communication unit (2010) may transmit and receive signals (e.g., data and control signals) to and from external devices such as other vehicles or BSs. The control unit (2020) may perform various operations by controlling constituent elements of the car or the autonomous vehicle (2000). The memory unit (2030) may store data/parameters/programs/code/commands for supporting various functions of the car or the autonomous vehicle (2000). The I/O unit (12040a) may output an AR/VR object based on information within the memory unit (2030). The I/O unit (12040a) may include a HUD. The positioning unit (2040b) may obtain information on the position of the car or the autonomous vehicle (2000). The position information may include information on an absolute position of the car or the autonomous vehicle (2000), information on the position of the car or the autonomous vehicle (2000) within a traveling lane, acceleration information, and information on the position of the car or the autonomous vehicle (2000) from a neighboring vehicle. The positioning unit (2040b) may include a GPS and various sensors.

As an example, the communication unit (2010) of the car or the autonomous vehicle (2000) may receive map information and traffic information from an external server and store the received information in the memory unit (2030). The positioning unit (2040b) may obtain the vehicle position information through the GPS and various sensors and store the obtained information in the memory unit (2030). The control unit (2020) may generate a virtual object based on the map information, traffic information, and vehicle position information and the I/O unit (2040a) may display the generated virtual object in a window in the vehicle (2050, 2060). The control unit (2020) may determine whether the car or the autonomous vehicle (2000) normally drives within a traveling lane, based on the vehicle position information. If the car or the autonomous vehicle (2000) abnormally exits from the traveling lane, the control unit (2020) may display a warning on the window in the vehicle through the I/O unit (2040a). In addition, the control unit (2020) may broadcast a warning message regarding driving abnormity to neighboring vehicles through the communication unit (2010). According to situation, the control unit (2020) may transmit the vehicle position information and the information on driving/vehicle abnormality to related organizations.

Figure 21:
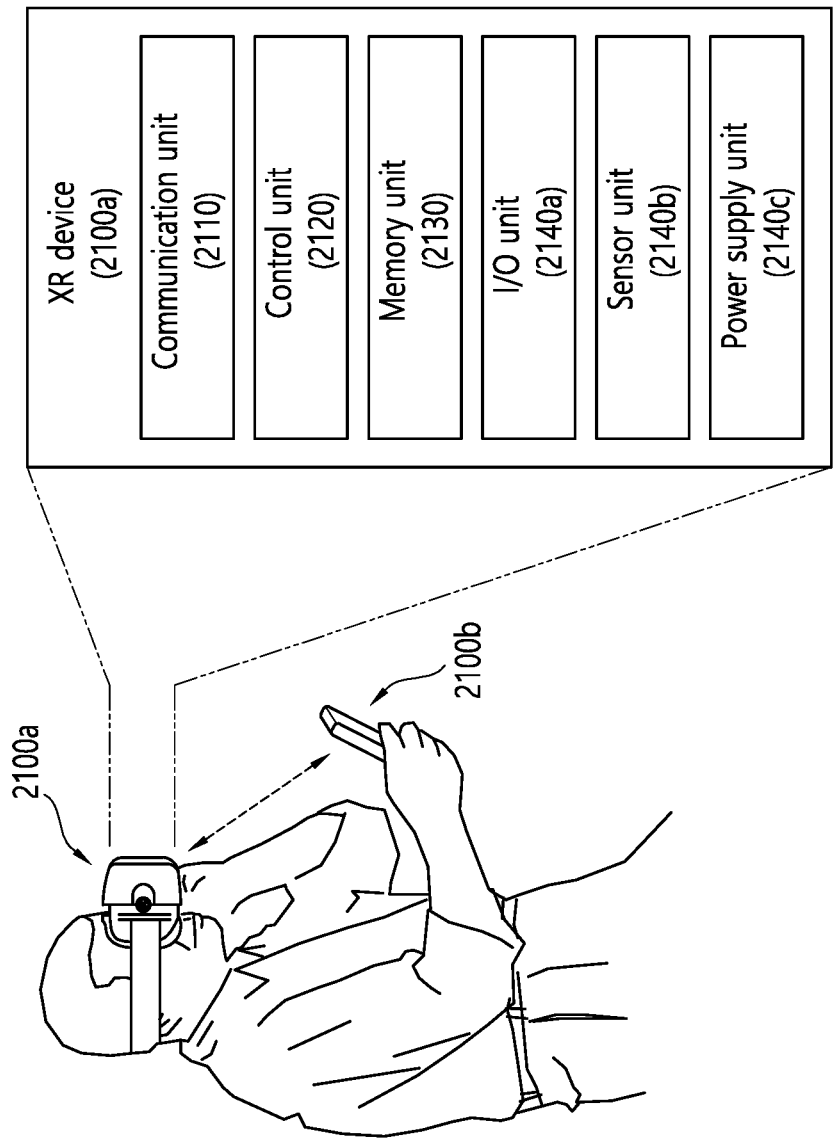
FIG. 21 shows an XR device applied to the present disclosure.

FIG. 21 shows an XR device applied to the present disclosure. The XR device may be implemented by an HMD, a HUD mounted in a vehicle, a television, a smartphone, a computer, a wearable device, a home appliance, a digital signage, a vehicle, a robot, and so on.

Referring to FIG. 21, an XR device (2100a) may include a communication unit (2110), a control unit (2120), a memory unit (2130), an I/O unit (2140a), a sensor unit (2140b), and a power supply unit (2140c).

The communication unit (2110) may transmit and receive signals (e.g., media data and control signals) to and from external devices such as other wireless devices, hand-held devices, or media servers. The media data may include video, images, and sound. The control unit (2120) may perform various operations by controlling constituent elements of the XR device (2100a). For example, the control unit (2120) may be configured to control and/or perform procedures such as video/image acquisition, (video/image) encoding, and metadata generation and processing. The memory unit (2130) may store data/parameters/programs/code/commands needed to drive the XR device (2100a)/generate XR object. The I/O unit (2140a) may obtain control information and data from the exterior and output the generated XR object. The I/O unit (2140a) may include a camera, a microphone, a user input unit, a display unit, a speaker, and/or a haptic module. The sensor unit (2140b) may obtain an XR device state, surrounding environment information, user information, and so on. The sensor unit (2140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (2140c) may supply power to the XR device (2100a) and include a wired/wireless charging circuit, a battery, and so on.

For example, the memory unit (2130) of the XR device (2100a) may include information (e.g., data) needed to generate the XR object (e.g., an AR/VR/MR object). The I/O unit (2140a) may receive a command for manipulating the XR device (2100a) from a user and the control unit (2120) may drive the XR device (2100a) according to a driving command of a user. For example, when a user desires to watch a film or news through the XR device (2100a), the control unit (2120) transmits content request information to another device (e.g., a hand-held device (2100b)) or a media server through the communication unit (2110). The communication unit (2110) may download/stream content such as films or news from another device (e.g., the hand-held device (2100b)) or the media server to the memory unit (2130). The control unit (2120) may control and/or perform procedures such as video/image acquisition, (video/image) encoding, and metadata generation/processing with respect to the content and generate/output the XR object based on information on a surrounding space or a real object obtained through the I/O unit (2140a)/sensor unit (2140b).

The XR device (2100a) may be wirelessly connected to the hand-held device (2100b) through the communication unit (2110) and the operation of the XR device (2100a) may be controlled by the hand-held device (2100b). For example, the hand-held device (2100b) may operate as a controller of the XR device (2100a). To this end, the XR device (2100a) may obtain information on a 3D position of the hand-held device (2100b) and generate and output an XR object corresponding to the hand-held device (2100b).

Figure 22:
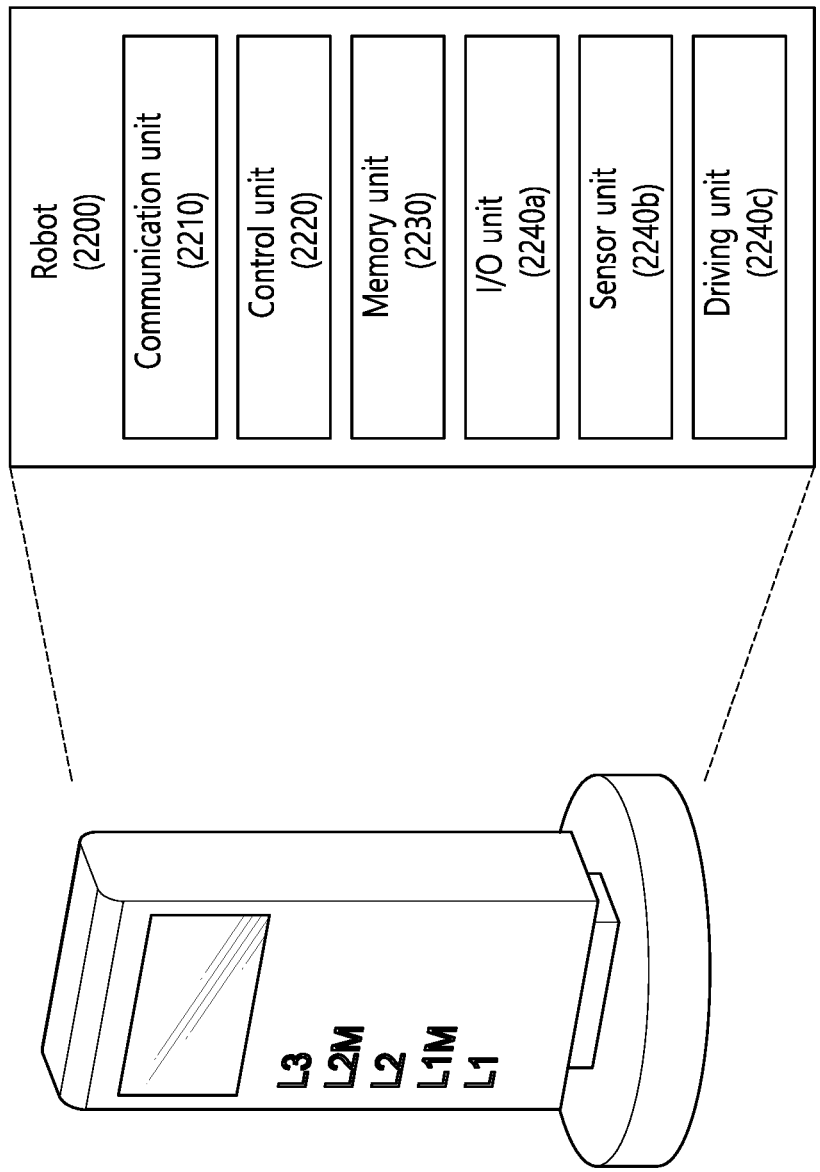
FIG. 22 shows a robot applied to the present disclosure.

FIG. 22 shows a robot applied to the present disclosure. The robot may be categorized into an industrial robot, a medical robot, a household robot, a military robot, and so on, according to a used purpose or field.

Referring to FIG. 22, a robot (2200) may include a communication unit (2210), a control unit (2220), a memory unit (2230), an I/O unit (2240a), a sensor unit (2240b), and a driving unit (2240c).

The communication unit (2210) may transmit and receive signals (e.g., driving information and control signals) to and from external devices such as other wireless devices, other robots, or control servers. The control unit (2220) may perform various operations by controlling constituent elements of the robot (2200). The memory unit (2230) may store data/parameters/programs/code/commands for supporting various functions of the robot (2200). The I/O unit (2240a) may obtain information from the exterior of the robot (2200) and output information to the exterior of the robot (2200). The I/O unit (2240a) may include a camera, a microphone, a user input unit, a display unit, a speaker, and/or a haptic module. The sensor unit (2240b) may obtain internal information of the robot (2200), surrounding environment information, user information, and so on. The sensor unit (2240b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (2240c) may perform various physical operations such as movement of robot joints. In addition, the driving unit (2240c) may cause the robot (2200) to travel on the road or to fly. The driving unit (2240c) may include an actuator, a motor, a wheel, a brake, a propeller, and so on.

Figure 23:
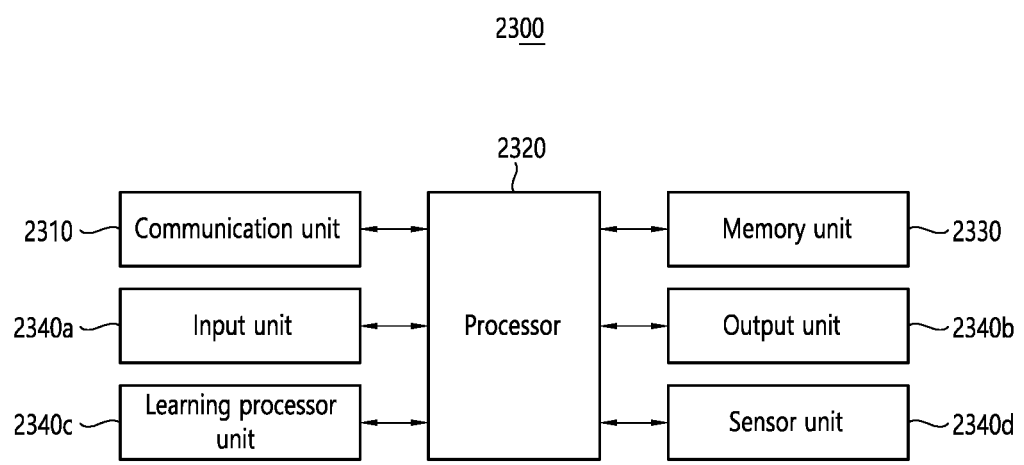
FIG. 23 shows an AI device applied to the present disclosure.

FIG. 23 shows an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 23, an AI device (2300) may include a communication unit (2310), a control unit (2320), a memory unit (2330), an I/O unit (2340a/2340b), a learning processor unit (2340c), and a sensor unit (2340d).

The communication unit (2310) may transmit and receive wired/radio signals (e.g., sensor information, user input, learning models, or control signals) to and from an external devices such as an AI server/devices (e.g., 400 of FIG. 14) using wired/wireless communication technology. To this end, the communication unit (2310) may transmit information within the memory unit (2330) to an external device and transmit a signal received from the external device to the memory unit (2330).

The control unit (2320) may determine at least one feasible operation of the AI device (2300), based on information which is determined or generated using a data analysis algorithm or a machine learning algorithm. The control unit (2320) may perform an operation determined by controlling constituent elements of the AI device (2300). For example, the control unit (2320) may request, search, receive, or use data of the learning processor unit (2340c) or the memory unit (2330) and control the constituent elements of the AI device (2300) to perform a predicted operation or an operation determined to be preferred among at least one feasible operation. The control unit (2320) may collect history information including the operation contents of the AI device (2300) and operation feedback by a user and store the collected information in the memory unit (2330) or the learning processor unit (2340c) or transmit the collected information to an external device such as an AI server/device (e.g., 400 of FIG. 14). The collected history information may be used to update a learning model.

The memory unit (2330) may store data for supporting various functions of the AI device (2300). For example, the memory unit (2330) may store data obtained from the input unit (2340a), data obtained from the communication unit (2310), output data of the learning processor unit (2340c), and data obtained from the sensor unit (2340d). The memory unit (2330) may store control information and/or software code needed to operate/drive the control unit (2320).

The input unit (2340a) may obtain various types of data from the exterior of the AI device (2300). For example, the input unit (2340a) may obtain learning data for model learning, and input data to which the learning model is to be applied. The input unit (2340a) may include a camera, a microphone, and/or a user input unit. The output unit (2340b) may generate output related to a visual, auditory, or tactile sense. The output unit (2340b) may include a display unit, a speaker, and/or a haptic module. The sensor unit (2340d) may obtain at least one of internal information of the AI device (2300), surrounding environment information of the AI device (2300), and user information, using various sensors. The sensor unit (2340d) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (2340c) may learn a model consisting of artificial neural networks, using learning data. The learning processor unit (2340c) may perform AI processing together with the learning processor unit of the AI server/device (e.g., 400 of FIG. 14). The learning processor unit (2340c) may process information received from an external device through the communication unit (2310) and/or information stored in the memory unit (2330). In addition, an output value of the learning processor unit (2340c) may be transmitted to the external device through the communication unit (2310) and may be stored in the memory unit (2330).

What is claimed is:

1. A method performed by a first device in a wireless communication system, the method comprising:
    transmitting, to a second device, sidelink control information (SCI) on a physical sidelink control channel (PSCCH) for scheduling of a physical sidelink shared channel (PSSCH);
    transmitting, to the second device, data on the PSSCH;
    receiving, from the second device, information related to hybrid automatic repeat and request (HARQ) feedback in response to the transmission of the PSSCH;
    decoding the HARQ feedback as an acknowledgement (ACK); and
    determining the HARQ feedback as a negative acknowledgement (NACK) based on that a signal strength of the information related to the HARQ feedback is less than or equal to a first threshold, wherein the first threshold is increased based on that a ratio that the first device determines NACK transmitted by the second device as ACK is higher than a second threshold, and wherein the ratio is based on information related to a HARQ feedback transmission history of the second device, transmitted from the second device.

2. The method of claim 1, wherein the first threshold is adjusted based on a number of times that the first device determines the NACK transmitted by the second device as the ACK during a specific time period.

3. The method of claim 1, wherein the first threshold is adjusted based on a number of times that the first device determines that ACK transmitted by the second device as the NACK.

4. The method of claim 1, wherein the first threshold is adjusted based on a number of times that the first device determines that ACK transmitted by the second device as the NACK during a specific time period.

5. The method of claim 1, wherein the HARQ feedback transmission history of the second device is received from the second device based on a request of the first device.

6. The method of claim 1, wherein the HARQ feedback transmission history of the second device is periodically received from the second device.

7. The method of claim 1, wherein the first threshold is received from a base station or is pre-configured by the first device.

8. The method of claim 1, wherein the first threshold is adjusted based on an offset.

9. The method of claim 1, wherein the first threshold is adjusted between a maximum threshold and a minimum threshold.

10. A first device adapted to perform wireless communication, the first device comprising:
at least one transceiver;
at least one processor; and
at least one memory connected to the at least one processor and storing instructions that, based on being executed, cause the first device to perform operations comprising:
transmitting, to a second device, sidelink control information (SCI) on a physical sidelink control channel (PSCCH) for scheduling of a physical sidelink shared channel (PSSCH);
transmitting, to the second device, data on the PSSCH;
receiving, from the second device, information related to hybrid automatic repeat and request (HARQ) feedback in response to the transmission of the PSSCH;
decoding the HARQ feedback as acknowledgement (ACK); and
determining the HARQ feedback as negative acknowledgement (NACK) based on that a signal strength of the information related to the HARQ feedback is less than or equal to a first threshold;
wherein the first threshold is increased based on that a ratio that the first device determines NACK transmitted by the second device as ACK is higher than a second threshold, and
wherein the ratio is based on information related to a HARQ feedback transmission history of the second device, transmitted from the second device.

11. A processing device adapted to control a first device, the processing device comprising:
at least one processor; and
at least one memory connected to the at least one processor and storing instructions that, based on being executed, cause the first device to perform operations comprising:
transmitting, to a second device, sidelink control information (SCI) on a physical sidelink control channel (PSCCH) for scheduling of a physical sidelink shared channel (PSSCH);
transmitting, to the second device, data on the PSSCH;
receiving, from the second device, information related to hybrid automatic repeat and request (HARQ) feedback in response to the transmission of the PSSCH;
decoding the HARQ feedback as acknowledgement (ACK); and
determining the HARQ feedback as negative acknowledgement (NACK) based on that a signal strength of the information related to the HARQ feedback is less than or equal to a first threshold;
wherein the first threshold is increased based on that a ratio that the first device determines NACK transmitted by the second device as ACK is higher than a second threshold, and
wherein the ratio is based on information related to a HARQ feedback transmission history of the second device, transmitted from the second device.

* * * * *